(12) United States Patent
Lee et al.

(10) Patent No.: US 10,355,529 B2
(45) Date of Patent: Jul. 16, 2019

(54) WIRELESS POWER RECEIVER AND CONTROL METHOD THEREOF

(71) Applicant: Samsung Electronics Co., Ltd., Gyeonggi-do (KR)

(72) Inventors: Kyung-Woo Lee, Seoul (KR); Eun-Tae Won, Seoul (KR); Young-Min Lee, Gyeonggi-do (KR); Se-Ho Park, Gyeonggi-do (KR); Noh-Gyoung Kang, Gyeonggi-do (KR); Kang-Ho Byun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 64 days.

(21) Appl. No.: 15/346,338

(22) Filed: Nov. 8, 2016

(65) Prior Publication Data

US 2017/0054331 A1    Feb. 23, 2017

Related U.S. Application Data

(63) Continuation of application No. 13/608,432, filed on Sep. 10, 2012, now Pat. No. 9,509,151.

(Continued)

(51) Int. Cl.
*H02J 50/12* (2016.01)
*H02J 50/20* (2016.01)
(Continued)

(52) U.S. Cl.
CPC ............ *H02J 50/12* (2016.02); *H02J 7/0013* (2013.01); *H02J 7/025* (2013.01); *H02J 50/10* (2016.02);

(Continued)

(58) Field of Classification Search
CPC .. H02J 50/10; H02J 50/12; H02J 50/20; H02J 50/50; H02J 50/60; H02J 50/80;
(Continued)

(56) References Cited

U.S. PATENT DOCUMENTS

2006/0270440 A1   11/2006   Shearer et al.
2008/0130617 A1    6/2008   Singh et al.
(Continued)

FOREIGN PATENT DOCUMENTS

CN        101180766        5/2008
CN        102027685        4/2011
(Continued)

OTHER PUBLICATIONS

Andreas Willig et al., "Passive Discovery of IEEE 802.15.4-Based Body Sensor Networks", Ad Hoc Networks, vol. 8, No. 7, Sep. 1, 2010.
(Continued)

*Primary Examiner* — Rexford N Barnie
*Assistant Examiner* — Elim Ortiz
(74) *Attorney, Agent, or Firm* — The Farrell Law firm, P.C.

(57) ABSTRACT

Methods and apparatus are provided for controlling a wireless power receiver for wirelessly receiving power. A drive power for driving the wireless power receiver is received from a wireless power transmitter. A communication network is established with the wireless power transmitter. A wireless power network that is controlled by the wireless power transmitter is joined. A charge power is received from the wireless power transmitter.

22 Claims, 16 Drawing Sheets

Related U.S. Application Data

(60) Provisional application No. 61/532,350, filed on Sep. 8, 2011.

(51) Int. Cl.
| | | |
|---|---|---|
| *H02J 50/50* | (2016.01) | |
| *H02J 50/10* | (2016.01) | |
| *H02J 7/02* | (2016.01) | |
| *H04B 5/00* | (2006.01) | |
| *H02J 7/00* | (2006.01) | |
| *H02J 50/80* | (2016.01) | |
| *H02J 50/60* | (2016.01) | |
| *H04W 48/16* | (2009.01) | |
| *H04W 48/20* | (2009.01) | |

(52) U.S. Cl.
CPC .............. *H02J 50/20* (2016.02); *H02J 50/50* (2016.02); *H02J 50/60* (2016.02); *H02J 50/80* (2016.02); *H04B 5/0031* (2013.01); *H04B 5/0037* (2013.01); *H02J 2007/0001* (2013.01); *H02J 2007/0096* (2013.01); *H04W 48/16* (2013.01); *H04W 48/20* (2013.01); *Y02B 40/90* (2013.01)

(58) Field of Classification Search
CPC .. H02J 7/0013; H02J 7/025; H02J 2007/0001; H02J 2007/0096; H04B 5/0031; H04B 5/0037; H04W 48/16; H04W 48/20; Y02B 40/90
See application file for complete search history.

(56) References Cited

U.S. PATENT DOCUMENTS

| | | |
|---|---|---|
| 2009/0271048 A1 | 10/2009 | Wakamatsu |
| 2009/0284082 A1 | 11/2009 | Mohammadian |
| 2010/0142423 A1 | 6/2010 | Zhu et al. |
| 2010/0244579 A1 | 9/2010 | Sogabe et al. |
| 2010/0253281 A1 | 10/2010 | Li |
| 2011/0053493 A1 | 3/2011 | Yanagihara |
| 2011/0062791 A1 | 3/2011 | Shearer et al. |
| 2011/0081857 A1 | 4/2011 | Lee et al. |
| 2011/0115431 A1 | 5/2011 | Dunworth et al. |
| 2011/0140671 A1 | 6/2011 | Kim et al. |
| 2011/0148349 A1 | 6/2011 | Kim et al. |
| 2011/0221388 A1 | 9/2011 | Low et al. |
| 2012/0146576 A1* | 6/2012 | Partovi ............... H01F 7/0252 320/108 |
| 2014/0361741 A1 | 12/2014 | Von Novak et al. |
| 2015/0002086 A1 | 1/2015 | Matos et al. |

FOREIGN PATENT DOCUMENTS

| | | |
|---|---|---|
| CN | 201904628 | 7/2011 |
| JP | 2008-543255 | 11/2008 |
| JP | 2006-525722 | 7/2009 |
| JP | 2009-268311 | 11/2009 |
| JP | 2010-074992 | 4/2010 |
| JP | 2010-541451 | 12/2010 |
| JP | 2011-045190 | 3/2011 |
| JP | 2011-146789 | 7/2011 |
| JP | 2011-159675 | 8/2011 |
| JP | 2012-182367 | 9/2012 |
| KR | 1020110069264 | 6/2011 |
| WO | WO 2006/127624 | 11/2006 |
| WO | WO 2007/089680 | 8/2007 |
| WO | WO 2011/063052 | 5/2011 |

OTHER PUBLICATIONS

German Castignani et al., "Cross-Layer Adaptive Scanning Algorithms for IEEE 802.11 Networks", 2011 IEEE Wireless Communications and Networking Conference, Mar. 28, 2011.
Chunlei Liu et al., "Optimal Scanning Strategy for Vehicular Wi-Fi", 2011 IEEE International Conference on Computer Science and Automation Engineering (CSAE), Jun. 10, 2011.
Japanese Office Action dated Sep. 12, 2016 issued in counterpart application No. 2014-529618, 8 pages.
Chinese Office Action dated Dec. 2, 2015 issued in counterpart application No. 201280043154.8, 8 pages.
Chinese Office Action dated May 3, 2018 issued in counterpart application No. 201610756389.1, 18 pages.
Korean Office Action dated Jul. 26, 2018 issued in counterpart application No. 10-2012-0099104, 7 pages.
Canadian Office Action dated Mar. 26, 2019 issued in counterpart application No. 2,848,146, 6 pages.

* cited by examiner

WIRELESS POWER RECEIVER AND
CONTROL METHOD THEREOF

PRIORITY

This application is a Continuation application of U.S. application Ser. No. 13/608,432, filed in the United States Patent and Trademark Office on Sep. 10, 2012, and claims priority under 35 U.S.C. § 119(e) to a United States Provisional Patent Application entitled "Wireless Power Receiver and Control Method Thereof" filed in the United States Patent and Trademark Office on Sep. 8, 2011 and assigned Ser. No. 61/532,350, the contents of each of which are incorporated herein by reference.

BACKGROUND OF THE INVENTION

1. Field of the Invention

The present invention relates generally to a wireless power receiver and a control method thereof, and more particularly, to a wireless power receiver capable of communicating in a predefined way and a control method thereof.

2. Description of the Related Art

A mobile terminal, such as, for example, a cellular phone or a Personal Digital Assistant (PDA), is powered by a rechargeable battery. In order to charge the rechargeable battery, electrical energy is supplied to the battery of the mobile terminal using a separate charging device. Typically, the charging device and the battery are both provided with a separate external contact terminal, so that the charging device and the battery are electrically connected by establishing contact between the external contact terminals.

However, a contact-type charging method is problematic in that the contact terminals can be contaminated with foreign substances because they protrude outward, thereby resulting in improper battery charging. Further, when the contact terminals are exposed to moisture, battery charging is not properly performed.

Wireless charging, or contactless charging technology, has been developed and applied to many electronic products in order to solve the above problems.

Wireless charging technology uses wireless power transmission/reception, examples of which include a system that can automatically charge a battery of a cellular phone by placing the cellular phone on a charging pad, without connecting the cellular phone to a separate charging connector. Electronic products that employ this technology include, for example, a wireless electric toothbrush and a wireless electric shaver, which are generally known to the public. The wireless charging technology is advantageous in that it can improve the waterproof function of an electronic product by wirelessly charging the electronic product. The wireless charging technology is also advantageous in that it can enhance the portability of the electronic product because it is not necessary to use a wired charger.

The wireless charging technology is roughly divided into an electromagnetic inductive coupling method using coils, a magnetic resonance coupling method using resonance, and a Radio Frequency (RF)/microwave radiation method in which electrical energy is transmitted via a microwave into which the electrical energy is converted.

The electromagnetic inductive coupling method has been the mainstream method of wireless charging, but a series of experiments to wirelessly transmit power at distances of several tens of meters by using a microwave have recently achieved success at home and abroad.

The electromagnetic inductive coupling method transfers power between primary and secondary coils. An induced current is produced when a magnet moves relative to a coil of wire. Using this principle, a magnetic field is generated at a transmitting end, and a current is induced at a receiving end, according to a change in the magnetic field in order to produce energy. This effect is referred to as the magnetic induction effect. A power transfer method using the magnetic induction effect is excellent in energy transmission efficiency.

The magnetic resonance coupling method originated with a system that can wirelessly transfer electricity even at several meters distance from a charging device by using the magnetic resonance power transfer principle based on the coupled mode theory. The wireless charging system used the physical concept of resonance, which is the phenomenon in which a wine glass resonates at a same oscillation frequency as an adjacent resonating tuning fork. Instead of sound, an electromagnetic wave carrying electric energy was made to resonate. Since this resonant electromagnetic wave is directly transferred only when a device having the resonance frequency exists, and its unused portion is reabsorbed into the electromagnetic field instead of spreading in the air, it is thought that unlike other electromagnetic waves, the resonant electromagnetic wave will have no influence on surrounding machines or human bodies.

Research on the wireless charging technology has been actively conducted, but a proposal has not been made to establish a standard for wireless charging priority, wireless power transmitter/receiver search, communication frequency selection between a wireless power transmitters and a wireless power receiver, wireless power control, matching circuit selection, communication time distribution for each wireless power receiver in one charging cycle, and the like.

SUMMARY OF THE INVENTION

The present invention has been made to address at least the above problems and/or disadvantages and to provide at least the advantages described below. Accordingly, an aspect of the present invention provides the standard for the overall operation of a wireless power transmitter/receiver, and more particularly, a configuration and procedure for a wireless power receiver to select a wireless power transmitter from which to wirelessly receive power.

In accordance with an aspect of the present invention, a method is provided that comprises receiving, from a wireless power transmitter, a first power for initiating a communication unit; establishing a communication connection with the wireless power transmitter while receiving the first power; joining a wireless power network corresponding to the wireless power transmitter while receiving the first power; receiving a command signal indicating a charge start command from the wireless power transmitter; and after receiving the command signal, receiving, from the wireless power transmitter, a second power for charging the wireless power receiver.

In accordance with another aspect of the present invention, a wireless power receiver is provided that comprises a communication unit; a power reception unit configured to receive, from a wireless power transmitter, a first power for initiating the communication unit. The communication unit is configured to establish a communication connection with the wireless power transmitter while receiving the first power, join a wireless power network corresponding to the wireless power transmitter while receiving the first power and receive a command signal indicating a charge start command from the wireless power transmitter. The power reception unit is configured to receive, from the wireless power transmitter, a second power for charging the wireless power receiver, after receiving the command signal.

In accordance with a further aspect of the present invention, a method is provided for controlling a wireless power transmitter, with the method comprising transmitting a first power for initiating a communication unit of the wireless power receiver; establishing a communication connection with the wireless power receiver while transmitting the first power; registering the wireless power receiver to a wireless power network corresponding to the wireless power transmitter while transmitting the first power; transmitting a command signal indicating a charge start command to the wireless power receiver; and after transmitting the command signal, transmitting a second power for charging the wireless power receiver.

In accordance with a still further aspect of the present invention, a wireless power transmitter is provided that comprises a power transmission unit configured to transmit a first power for initiating a communication unit of a wireless power receiver; a communication unit configured to establish a communication connection with the wireless power receiver while transmitting the first power; and a controller configured to register the wireless power receiver to a wireless power network corresponding to the wireless power transmitter while transmitting the first power. The communication unit is further configured to transmit a command signal indicating a charge start command to the wireless power receiver. The power transmission unit is further configured to transmit a second power for charging the wireless power receiver, after transmitting the command signal.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
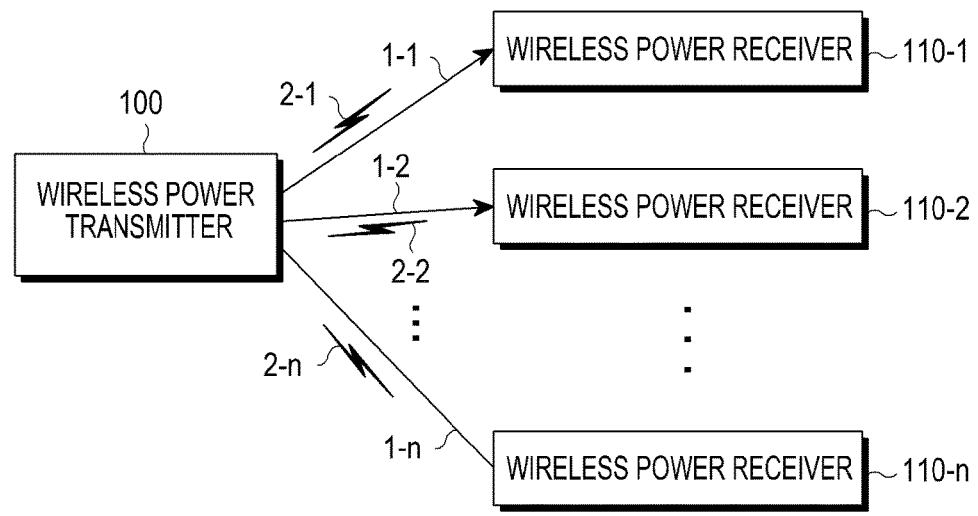
FIG. 1 is a diagram illustrating an overall operation of a wireless charging system, according to an embodiment of the present invention.

Embodiments of the present invention are described in detail with reference to the accompanying drawings. The same or similar components may be designated by the same or similar reference numerals although they are shown in different drawings. Further, although numerical limitations are provided in the specification, it should be noted that such numerical limitations are provided only by way of example. Further, detailed descriptions of constructions or processes known in the art may be omitted to avoid obscuring the subject matter of the present invention.

FIG. 1 is a diagram illustrating an overall operation of a wireless charging system, according to an embodiment of the present invention. As shown in FIG. 1, the wireless charging system includes a wireless power transmitter 100 and at least one wireless power receiver 110-1, 110-2, . . . , 110-n.

The wireless power transmitter 100 wirelessly transmits power to the at least one wireless power receiver 110-1, 110-2, . . . , 110-n, respectively. More specifically, the wireless power transmitter 100 wirelessly transmits power only to authenticated wireless power receivers that have completed a given authentication procedure.

The wireless power transmitter 100 makes an electrical connection with each wireless power receiver 110-1, 110-2, . . . , 110-n. For example, the wireless power transmitter 100 wirelessly transmits power in the form of an electromagnetic wave to each wireless power receiver 110-1, 110-2, . . . , 110-n.

In addition, the wireless power transmitter 100 performs bidirectional communication with each wireless power receiver 110-1, 110-2, . . . , 110-n. The wireless power transmitter 100 and each wireless power receiver 110-1, 110-2, . . . , 110-n processes or transmits/receives a packet including a predetermined frame. This frame will be described in greater detail below. In particular, each wireless power receiver 110-1, 110-2, . . . , 110-n may be implemented by a mobile communication terminal, a PDA, a Personal Media Player (PMP), a smart phone, and the like.

The wireless power transmitter 100 wirelessly provides power to a plurality of wireless power receivers 110-1, 110-2, . . . , 110-n. For example, the wireless power transmitter 100 transmits power to a plurality of wireless power receivers 110-1, 110-2, . . . , 110-n by using the magnetic resonance coupling method. When the wireless power transmitter 100 employs the magnetic resonance coupling method, the distance between the wireless power transmitter and the plurality of wireless power receivers 110-1, 110-2, . . . , 110-n is preferably less than or equal to 30 m. When the wireless power transmitter 100 employs the electromagnetic inductive coupling method, the distance between the wireless power transmitter 100 and the plurality of wireless power receivers 110-1, 110-2, . . . , 110-n is preferably less than or equal to 10 cm.

Each wireless power receiver 110-1, 110-2, . . . , 110-n receives power from the wireless power transmitter 100 to perform charging of a battery provided therein. Also, the wireless power receivers 110-1, 110-2, . . . , 110-n transmits a request signal for wireless power transmission, information for wireless power reception, wireless power receiver state information, wireless power transmitter control information, or the like, to the wireless power transmitter 100. Such signals or information are described in greater detail below.

Each wireless power receiver 110-1, 110-2, . . . , 110-n transmits a message indicating its charge status to the wireless power transmitter 100.

The wireless power transmitter 100 includes a display means, such as, for example, a liquid crystal display, and displays the status of each wireless power receiver 110-1, 110-2, . . . , 110-n, based on a message received from each wireless power receiver 110-1, 110-2, . . . , 110-n. Further, the wireless power transmitter 100 also displays a period of time expected until each wireless power receiver 110-1, 110-2, . . . , 110-n completes its charging, in addition to the status of each wireless power receiver 110-1, 110-2, . . . , 110-n.

The wireless power transmitter 100 may transmit a control signal for disabling the wireless charging function to each wireless power receiver 110-1, 110-2, . . . , 110-n. Upon receiving the control signal for disabling the wireless charging function, the wireless power receiver disables the wireless charging function.

Figure 2A:
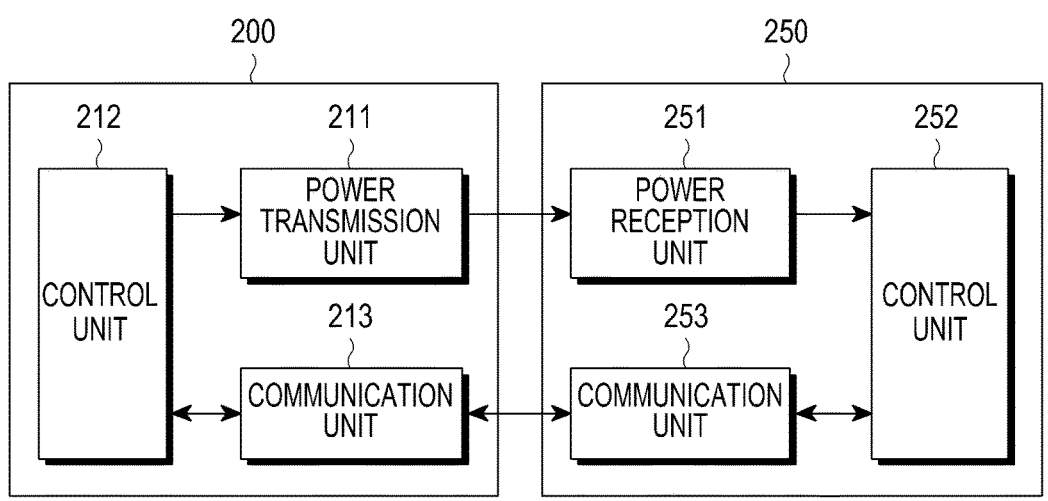
FIG. 2A is a block diagram illustrating structures of a wireless power transmitter and a wireless power receiver, according to an embodiment of the present invention.

FIG. 2A is a block diagram illustrating structures of a wireless power transmitter and a wireless power receiver, according to an embodiment of the present invention.

As shown in FIG. 2A, the wireless power transmitter 200 includes a power transmission unit 211, a control unit 212, and a communication unit 213. The wireless power receiver 250 includes a power reception unit 251, a control unit 252, and a communication unit 253.

The power transmission unit 211 provides power required by the wireless power transmitter 200, and wirelessly transmits power to the wireless power receiver 250. The power transmission unit 211 directly powers the wireless power receiver 250 with an Alternating Current (AC) power waveform, or provides the wireless power receiver 250 with an AC power waveform by providing a Direct Current (DC) power waveform and converting the DC power waveform into an AC power waveform using an inverter. The power transmission unit 211 may also be implemented in the form of an internal battery or a power receiving interface to receive power from an external source and provide other components with the received power. Those skilled in the art will readily understand that there is no limitation on the power transmission unit 211, as long as it can provide a certain AC power waveform.

The power transmission unit 211 also provides the wireless power receiver 250 with an AC power waveform in the form of an electromagnetic wave. The power transmission 211 further includes a loop coil, and thus, transmits or receives a predetermined electromagnetic wave. When the power transmission unit 211 is implemented by a loop coil, the loop coil has a variable inductance (L). Those skilled in the art will readily understand that there is no limitation on the power transmission unit 211, as long as it can transmit/receive an electromagnetic wave.

The control unit 212 controls the overall operation of the wireless power transmitter 200. The control unit 212 controls the overall operation of the wireless power transmitter 200 by using an algorithm, program, or application required for the control, which is read out from a storage unit. The control unit 212 may be implemented in the form of a Central Processing Unit (CPU), microprocessor, minicomputer, or the like. The detailed operation of the control unit 212 is described in greater detail below.

The communication unit 213 performs communication with the wireless power receiver 250 in a predefined manner. The communication unit 213 performs communication with the communication unit 253 of the wireless power receiver 250 by using Near Field Communication (NFC), ZigBee communication, infrared communication, visible light communication, Bluetooth communication, Bluetooth low energy communication, or the like. According to an embodiment of the present invention, the communication unit 213 performs communication by using IEEE 802.15.4 ZigBee communication. A configuration for selecting a frequency and a channel for use by the communication unit 213 is described in greater detail below. The above-described communication schemes are merely illustrative, and the scope of the present invention is not limited by a specific communication scheme performed by the communication unit 213.

In addition, the communication unit 213 transmits a signal containing information on the wireless power transmitter 200. The communication unit 213 may unicast, multicast, or broadcast the signal. Table 1 shows the data structure of a signal transmitted from the wireless power transmitter 200, according to an embodiment of the present invention. The wireless power transmitter 200 transmits a signal having a frame, as shown below in Table 1, in a predetermined cycle. This signal is referred to as "Notice signal".

TABLE 1

| Frame Type | Protocol Version | Sequence Number | Network ID | RX to Report (schedule mask) | Reserved | Number of Rx |
|---|---|---|---|---|---|---|
| Notice | 4 bit | 1 byte | 1 byte | 1 byte | 5 bit | 3 bit |

In Table 1, "Frame Type" is a field indicating a signal type, and indicates that a corresponding signal is a Notice signal. "Protocol Version" is a field indicating a communication protocol type, and may be allocated, for example, 4 bits. "Sequence Number" is a field indicating the sequence of a corresponding signal, and may be allocated, for example, 1 byte. As an example, "Sequence Number" may be increased by 1 in correspondence with signal transmission/reception steps. "Network ID" is a field indicating the network IDentifier (ID) of the wireless power transmitter 200, and may be allocated, for example, 1 byte. "Rx to Report (schedule mask)" is a field indicating wireless power receivers that are to transmit a report to the wireless power transmitter 200, and may be allocated, for example, 1 byte. Table 2 shows an Rx to Report (schedule mask) field, according to an embodiment of the present invention.

TABLE 2

| Rx to Report (schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 may correspond to wireless power receivers 1 to 8. The Rx to Report (schedule mask) may be implemented such that a wireless power receiver whose schedule mask number is 1 transmits a report to the wireless power transmitter 200.

Referring back to Table 1, "Reserved" is a field reserved for future use, and may be allocated, for example, 5 bytes. "Number of Rx" is a field indicating the number of wireless power receivers around the wireless power transmitter 200, and may be allocated, for example, 3 bits.

A signal having the frame format shown in Table 1 may be implemented in a format allocated to WPT of the IEEE802.15.4 data structure. Table 3 shows the IEEE802.15.4 data structure.

TABLE 3

| Preamble | SFD | Frame Length | WPT | CRC16 |
|---|---|---|---|---|

As shown in Table 3, the IEEE802.15.4 data structure may include "Preamble", "SFD", "Frame Length", "WPT", and "CRC16" fields, and the data structure of Table 1 may be included in the WPT field.

The communication unit 213 receives power information from the wireless power receiver 250. The power information may include at least one of the capacity, battery level, charge count, battery usage, battery capacity, and battery percentage of the wireless power receiver 250. Also, the communication unit 213 transmits a charging function control signal for controlling the charging function of the wireless power receiver 250. The charging function control signal may be a control signal for controlling the power reception unit 251 of a specific wireless power receiver 250 to enable or disable the charging function of the wireless power receiver 250.

The communication unit 213 may also receive a signal from another wireless power transmitter, as well as the wireless power receiver 250. As an example, the communication unit 213 may receive a Notice signal having the frame of Table 1 from another wireless power transmitter.

Although FIG. 2A illustrates the power transmission unit 211 and the communication unit 213 as different hardware units, and thus, the wireless power transmitter 200 performs out-band communication, this is merely illustrative. According to an embodiment of the present invention, it is also possible for the power transmission unit 211 and the communication unit 213 to be implemented as a single hardware unit, and thus, the wireless power transmitter performs in-band communication.

The wireless power transmitter 200 and the wireless power receiver 250 transmit/receive various signals, which allows the wireless power receiver 250 to perform a process of joining a wireless power network that is under the control of the wireless power transmitter 200 and a charging process through wireless power transmission/reception. These processes are described in greater detail below.

Figure 2B:
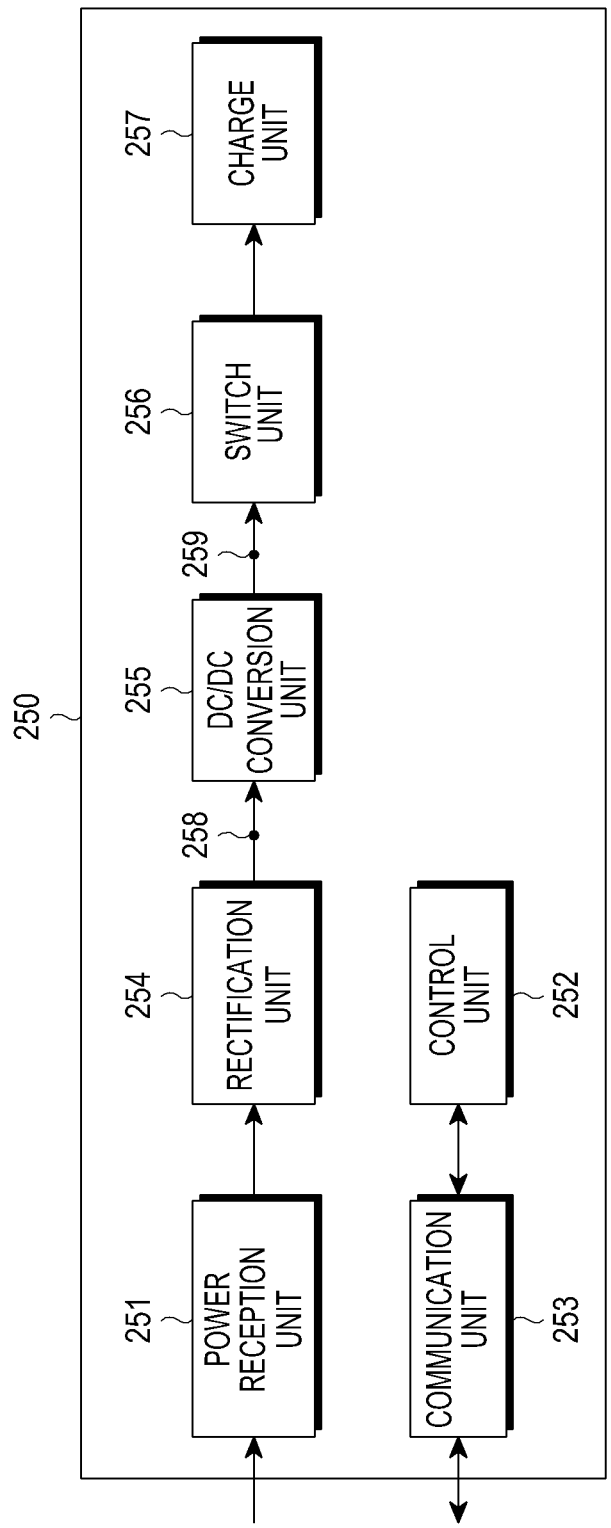
FIG. 2B is a block diagram illustrating a detailed structure of a wireless power receiver, according to an embodiment of the present invention.

FIG. 2B is a block diagram illustrating a detailed structure of a wireless power receiver, according to an embodiment of the present invention.

As shown in FIG. 2B, the wireless power receiver 250 includes a power reception unit 251, a control unit 252, a communication unit 253, a rectification unit 254, a DC/DC conversion unit 255, a switch unit 256, and a charge unit 257.

The power reception unit 251, the control unit 252, and the communication unit 253 are described in connection with FIG. 2A. The rectification unit 254 rectifies power wirelessly received by the power reception unit 251 to DC power, and may be implemented, for example, in the form of a bridge diode. The DC/DC conversion unit 255 converts the rectified power by a predetermined gain. For example, the DC/DC conversion unit 255 converts the rectified power such that a voltage at an output stage 259 is 5V. In addition, a voltage that can be applied to an input stage 258 of the DC/DC conversion unit 255 has predetermined maximum and minimum values. This information is recorded in "Input Voltage MIN" and "Input Voltage MAX" fields of a "Request Join" signal, as described in greater detail below. Also, a rated voltage value applied to the output stage 259 of the DC/DC conversion unit 255 and a rated current value conducted to the output stage 259 of the DC/DC conversion unit 255 is recorded in "Typical Output Voltage" and "Typical Output Current" fields of a "Request Join" signal, respectively.

The switch unit 256 connects the DC/DC conversion unit 255 to the charge unit 257. The switch unit 256 maintains an ON/OFF state under the control of the control unit 252. The charge unit 257 stores converted power input from the DC/DC conversion unit 255 when the switch unit is in an ON state.

Figure 3A:
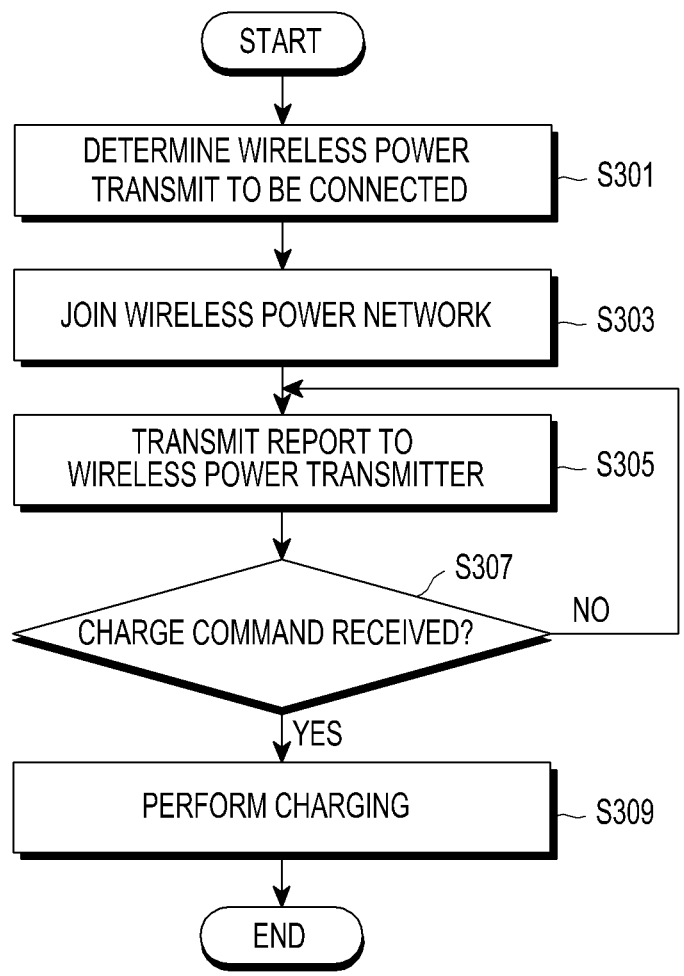
FIG. 3A is a flowchart illustrating a method of controlling a wireless power receiver, according to an embodiment of the present invention.

FIG. 3A is a flowchart illustrating a method of controlling a wireless power receiver, according to an embodiment of the present invention.

The wireless power receiver 250 determines a wireless power transmitter 200 from which to wirelessly receive power, in step S301. For example, the wireless power receiver 250 determines a wireless power receiver 200 from which to wirelessly receive power, based on the Received Signal Strength Indicator (RSSI) of a search response signal received from the wireless power transmitter 200, which is described in greater detail below.

The wireless power receiver 250 joins a wireless power network that is under the control of the wireless power transmitter 200, in step S303. For example, the wireless power receiver 250 transmits a joining request signal, and joins a wireless power network, based on a joining response signal received in response to the joining request signal, which is described in greater detail below.

The wireless power receiver 250 transits a report signal in response to a command signal received from the wireless power transmitter 200, in step S305. When the wireless power receiver 250 receives a command signal containing a charging command from the wireless power transmitter 200 it performs charging, in step S309. Contrarily, when the wireless power receiver 250 does not receive a command signal containing a charging command from the wireless power transmitter 200, it transmits a report to the wireless power transmitter 200, in step S305.

Figure 3B:
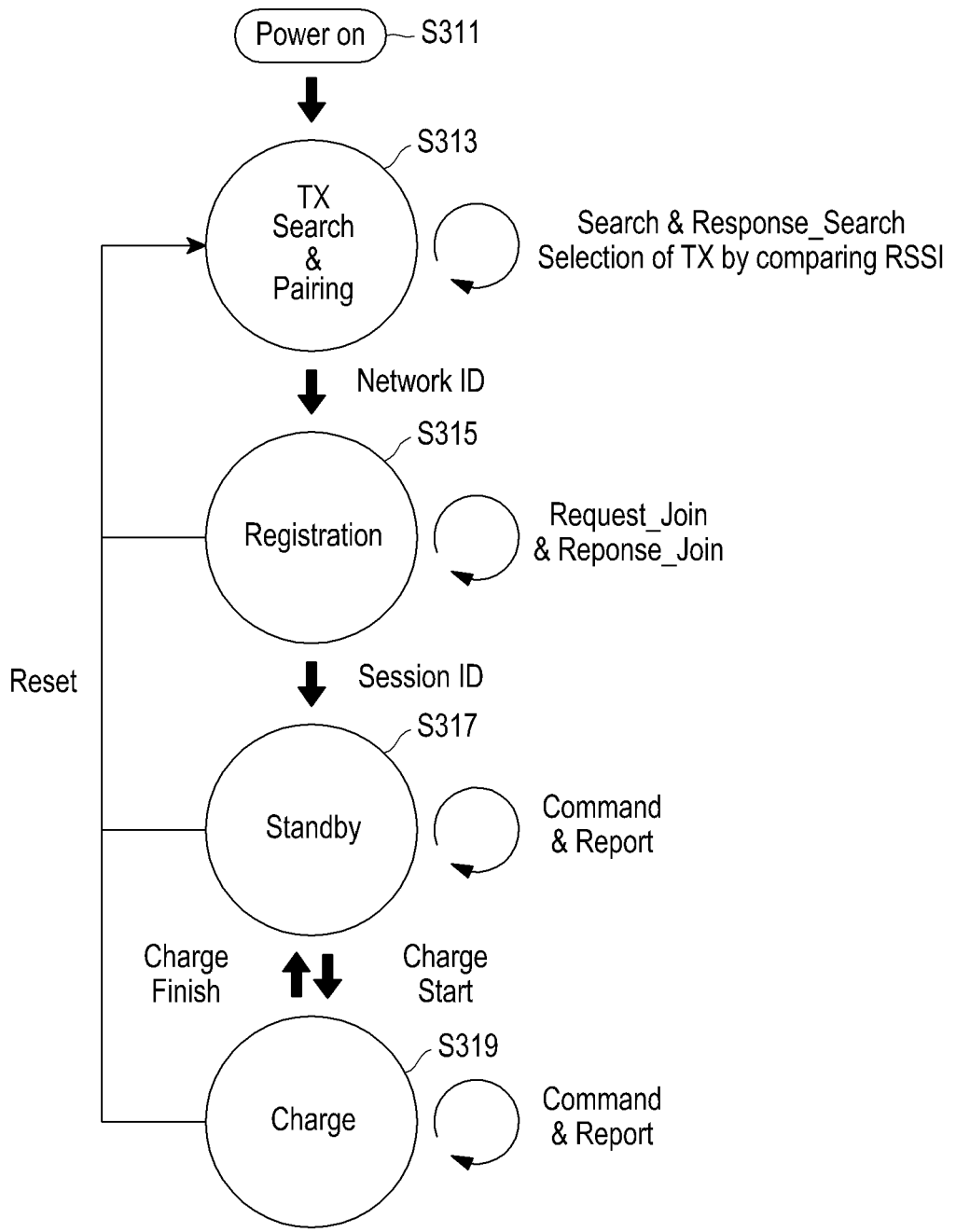
FIG. 3B is a flowchart illustrating a method of controlling a wireless power receiver, according to another embodiment of the present invention.

FIG. 3B is a flowchart illustrating a method of controlling a wireless power receiver, according to another embodiment of the present invention.

The wireless power receiver 250 is powered on or disposed in the vicinity of wireless power transmitters, in step S311. The wireless power receiver 250 searches wireless power transmitters and establishes a communication network with one wireless power transmitter 200 from among the searched wireless power transmitters, in step S313. The wireless power receiver 250 transmits a wireless power transmitter search signal to wireless power transmitters, and determines one wireless power transmitter 200, based on search response signals received from the wireless power transmitters. The wireless power receiver 250 identifies each wireless power transmitter by its network ID.

The wireless power receiver 250 joins a wireless power network that is under the control of the determined the wireless power transmitter 200, in step S315. For example, the wireless power receiver 250 transmits a joining request signal to the wireless power transmitter 200, and joins a wireless power network, based on a joining response signal received in response to the joining request signal. When the wireless power receiver 250 joins the wireless power network that is under the control of the wireless power transmitter 200, the wireless power transmitter 200 allocates a session ID to the wireless power receiver 250.

The wireless power receiver 250 maintains a standby state before performing charging, in step S317. The wireless power receiver 250 receives a command signal from the wireless power transmitter 200, and transmits a report signal to the wireless power transmitter 200 in response to the command signal. When a command signal containing a charging command is received from the wireless power transmitter 200, the wireless power receiver 250 begins charging, in step 319. For example, the wireless power receiver 250 performs charging by controlling the switch unit 256 into an ON state. When charging of the wireless power receiver 250 is completed or transmitted power is not enough to fully charge the charge unit of the wireless power receiver 250, the wireless power transmitter 200 controls the wireless power receiver 250 to be in a standby state. In addition, the wireless power receiver 250 is controlled such that it must always enter a standby state before transitioning from a registration state to a charge state.

Figure 4:
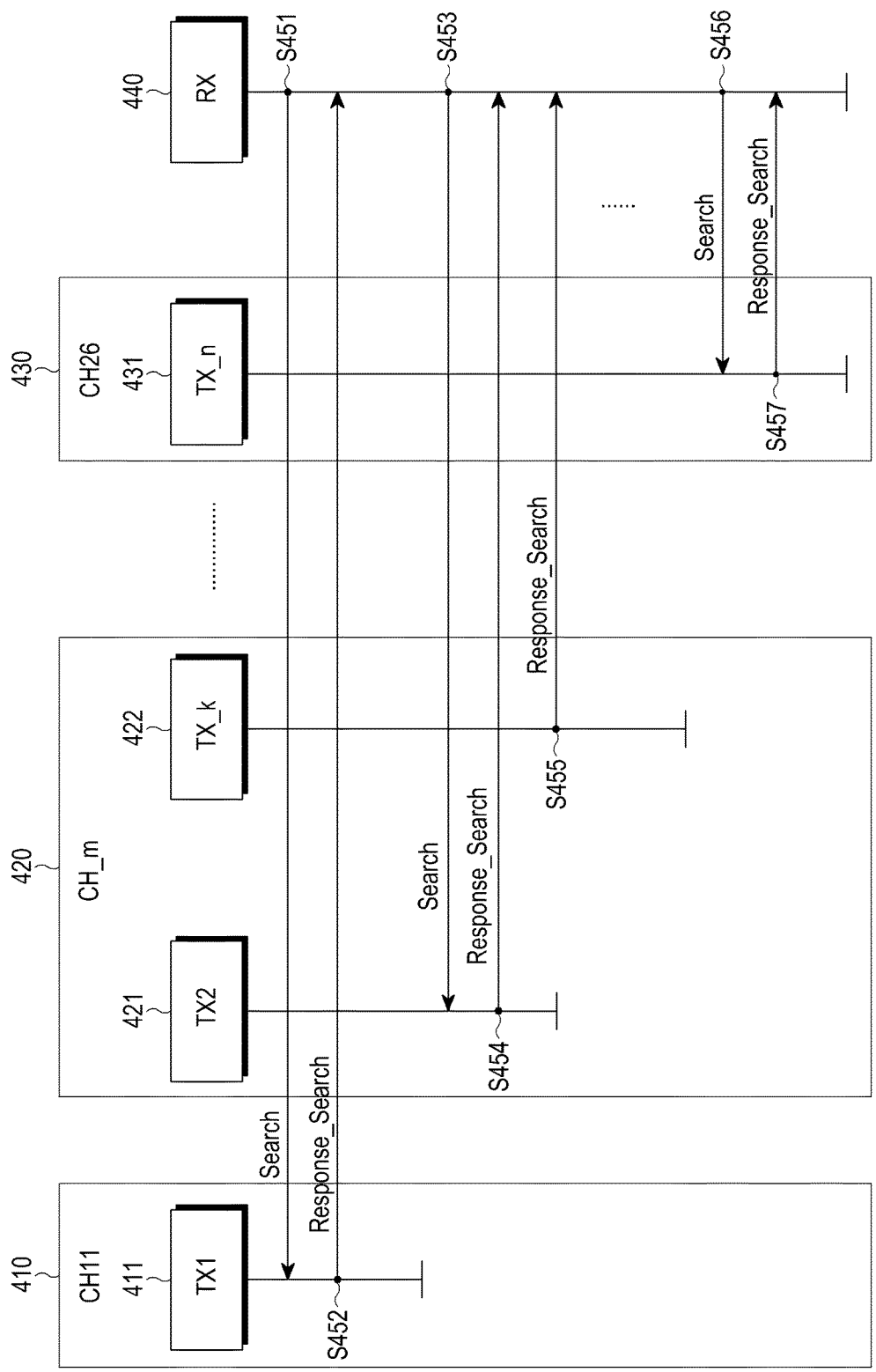
FIG. 4 is a timing chart of a wireless power network, according to an embodiment of the present invention.

FIG. 4 is a timing chart of a wireless power network, according to an embodiment of the present invention. In particular, FIG. 4 is a timing chart illustrating a procedure in which a wireless power receiver (RX) 440 searches a plurality of wireless power transmitters (TXs) 411, 421, 422,431, and determines a wireless power transmitter with which to establish pairing.

The wireless power receiver 440 transmits a wireless power transmitter search signal over IEEE802.15.4 channel 11 410, in step S451. The IEEE802.15.4 standard covers channel 11 to channel 26. The relation between channels and frequencies in the IEEE802.15.4 standard is shown below in Table 4. In Table 4, all frequencies are in kHz.

TABLE 4

| Frequency | Channel |
|---|---|
| 2405 | 11 |
| 2410 | 12 |
| 2415 | 13 |

TABLE 4-continued

| Frequency | Channel |
|---|---|
| 2420 | 14 |
| 2425 | 15 |
| 2430 | 16 |
| 2435 | 17 |
| 2440 | 18 |
| 2445 | 19 |
| 2450 | 20 |
| 2455 | 21 |
| 2460 | 22 |
| 2465 | 23 |
| 2470 | 24 |
| 2475 | 25 |
| 2480 | 26 |

The wireless power receiver 440 may generate a wireless power transmitter search signal, and transmit the generated wireless power transmitter search signal to the wireless power transmitter 411 of channel 11 410, in step S451. The wireless power transmitter search signal may have a data structure as shown below in Table 5, and is referred to as "Search signal".

TABLE 5

| Frame Type | Protocol Version | Sequence Number | Company ID | Product ID | Impedance | Class |
|---|---|---|---|---|---|---|
| Search | 4 bit | 1 byte | 1 byte | 4 byte | 4 bit | 4 bit |

In Table 5, "Frame Type" is a field indicating a signal type, and indicates that a corresponding signal is a Search signal. "Protocol Version" is a field indicating a communication protocol type, and is allocated, for example, 4 bits. "Sequence Number" is a field indicating the sequence of a corresponding signal, and is allocated, for example, 1 byte. For example, "Sequence Number" may be increased by 1 in correspondence with signal transmission/reception steps. Specifically, if the Notice signal of Table 1 has a sequence number of 1, then the Search signal of Table 5 has a sequence number of 2. "Company ID" is a field indicating the manufacturer information of the wireless power receiver 440, and is allocated, for example, 1 byte. "Product ID" is a field indicating the product information of the wireless power receiver 440, and for example, the serial number information of the wireless power receiver 440 is recorded in this field. The "Product ID" field is allocated, for example, 4 bytes. "Impedance" is a field indicating the impedance information of the wireless power receiver 440, and is allocated, for example, 4 bits. "Class" is a field indicating the rated power information of the wireless power receiver 440, and is allocated, for example, 4 bits.

The wireless power transmitter 411 receives the Search signal in step S451, and generate a wireless power transmitter search response signal in response to the Search signal. The wireless power transmitter search response signal has a data structure as shown below in Table 6, and is referred to as "Response Search signal".

TABLE 6

| Frame Type | Sequence number | Protocol Version | HW Version | Network ID | Company ID | Product ID | Class |
|---|---|---|---|---|---|---|---|
| Response Search | 1 Byte | 1 Byte | 1 Byte | 1 Byte | 1 Byte | 4 Byte | 1 Byte |

In Table 6, "Frame Type" is a field indicating a signal type, and indicates that a corresponding signal is a Response Search signal. "Sequence Number" is a field indicating the sequence of a corresponding signal, and is allocated, for example, 1 byte. For example, "Sequence Number" may be increased by 1 in correspondence with signal transmission/reception steps. "Protocol Version" is a field indicating the protocol version, and is allocated, for example, 1 byte. "HW Version" is a field indicating the hardware version of the wireless power transmitter, and is allocated, for example, 1 byte. "Network ID" is a field indicating the network identifier (ID) of the wireless power transmitter 411, and is allocated, for example, 1 byte. "Company ID" is a field indicating the information of manufacturer, and is allocated, for example, 1 byte. "Product ID" is a field indicating the device information for the wireless power transmitter, and is allocated, for example, 4 byte. "Class" is a field indicating the information of the power class of the wireless power transmitter, and is allocated, for example, 1 byte.

The wireless power receiver 440 receives the Response Search signal in step S452, and stores the RSSI information of the Response Search signal. Upon completion of performing the operation for channel 11 410, the wireless power receiver 440 performs channel changing to channel m 420 and repeat the above operation. More specifically, the wireless power receiver 440 transmits a Search signal in step S453. Each of the wireless power transmitters 421, 422 existing in channel m 420 transmits a Response Search signal to the wireless power receiver 440 in steps S454 and S455. The wireless power receiver 440 stores the RSSI information of the Response Search signals received in steps S454 and S455.

Upon completion of performing the operation for channel m 420, the wireless power receiver 440 performs channel changing to channel 26 430 and repeats the above operations. More specifically, the wireless power receiver 440 transmits a Search signal in step S456. The wireless power transmitter 431 existing in channel 26 430 transmits a Response Search signal to the wireless power receiver 440, in step S457. The wireless power receiver 440 stores the RSSI information of the Response Search signal received in step S457.

The wireless power receiver 440 determines a wireless power transmitter having the smallest RSSI value as the wireless power transmitter from which to receive power.

Figure 5A:
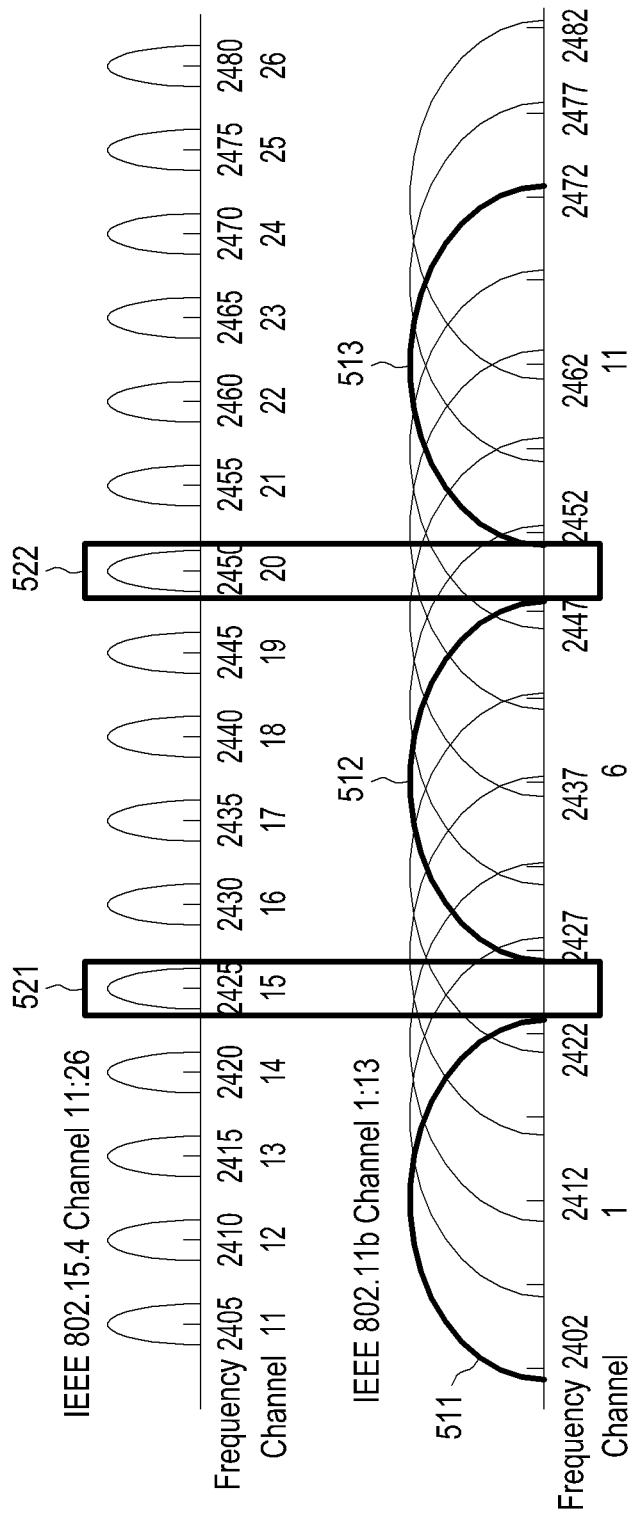
FIG. 5A illustrates a comparison between frequencies used for a wireless power receiver and Wi-Fi communication, according to an embodiment of the present invention.
Figure 5B:
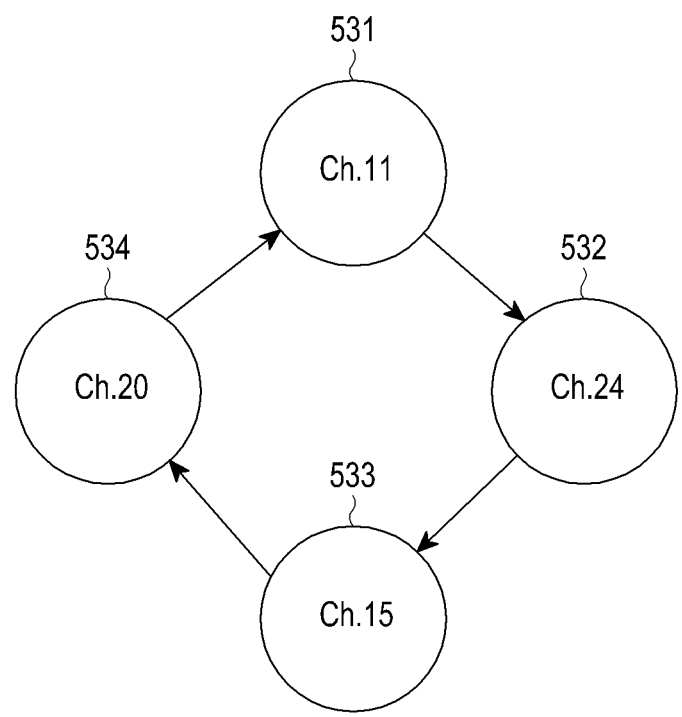
FIG. 5B is a diagram illustrating an order in which a wireless power receiver performs channel scanning, according to an embodiment of the present invention.

The wireless power receiver 440 performs channel changing in a way as shown in FIGS. 5A and 5B. The wireless power receiver 440 performs channel scanning in order of, for example, channel 11, channel 24, channel 15, and channel 20. A recent wireless power receiver, for example, a smart phone, includes a Wi-Fi module separate from a communication module for communication with a wireless power transmitter. Wi-Fi communication uses a frequency band as shown in FIG. 5A. FIG. 5A compares frequencies used for a wireless power receiver and Wi-Fi communication.

The upper graph of FIG. 5A illustrates the concept of IEEE802.15.4 communication using frequencies and channels, as shown in Table 4. Similar to Table 4, the relation between IEEE802.15.4 frequencies and channels is shown in the upper graph.

The lower graph of FIG. 5A illustrates frequencies and channels used in Wi-Fi communication. Wi-Fi channel 1 511 uses a frequency of about 2402 to 2422kHz, Wi-Fi channel 6 512 uses a frequency of about 2427 to 2447 kHz, and Wi-Fi channel 11 513 uses a frequency of about 2452 to 2472 kHz.

Specifically, it can be confirmed that IEEE802.15.4 channels not corresponding to the frequencies used in Wi-Fi communication or corresponding to relatively weak Wi-Fi signals are channel 11, 15, 20, and 24, as shown, for example, by reference numerals 521 and 522.

Accordingly, the wireless power receiver 440 may perform channel scanning for channel 11, 15, 20, and 24.

FIG. 5B is a diagram illustrating an order in which the wireless power receiver 440 performs channel scanning. The wireless power receiver 440 scans channel 11 531, channel 24 532, channel 15 533, and then channel 20 534. A channel at which the wireless power receiver begins channel scanning may vary.

A configuration for the wireless power receiver 440 to determine a wireless power transmitter from which to wirelessly receive power is described above. Hereinafter, a description is provided of a procedure for the wireless power receiver 440 to join the wireless power network that is under the control of the determined wireless power transmitter.

Figure 6:
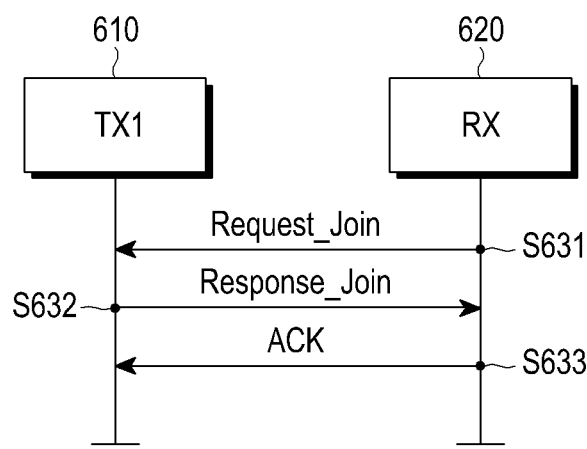
FIG. 6 is a timing chart illustrating a procedure for a wireless power receiver to join a wireless power network, according to an embodiment of the present invention.

FIG. 6 is a timing chart illustrating a procedure for a wireless power receiver to join a wireless power network controlled by a wireless power transmitter, according to an embodiment of the present invention.

A wireless power receiver 620 transmits a joining request signal to a wireless power transmitter 610, in step S631.

The wireless power receiver 620 generates a joining request signal (hereinafter referred to as "Request Join signal") and transmits the generated Request Join signal. The wireless power receiver 620 receives a joining response signal (hereinafter referred to as "Response Join signal") from the wireless power transmitter 610, in step S632, and thus, can determine whether it is permitted to join the wireless power network. The wireless power receiver 620 transmits an Acknowledgement (ACK) signal to the wireless power transmitter 610, in step S633. However, the wireless power receiver 620 may also omit transmission of the ACK signal.

Based on the received Request Join signal, the wireless power transmitter 610 determines whether to permit the wireless power receiver 620 to join the wireless power network. For example, the wireless power transmitter 610 determines if the amount of power required by the wireless power receiver 620 exceeds the amount of possible output power of the wireless power transmitter 610, and thereby determines whether to permit the wireless power receiver 620 to join the wireless power network. The wireless power transmitter 610 generates a Response Join signal containing information on whether or not the wireless power receiver 620 is permitted to join the wireless power network, and transmit the generated Response Join signal to the wireless power receiver 620.

The Request Join and Response Join signals have data structures shown below in Tables 7 and 8, respectively.

TABLE 7

| Frame Type | Reserved | Sequence Number | Network ID | Product ID | Input Voltage MIN | Input Voltage MAX | Typical Output Voltage | Typical Output Current |
|---|---|---|---|---|---|---|---|---|
| Request Join | 4 bit | 1 byte | 1 byte | 4 byte | 1 byte | 1 byte | 1 byte | 1 byte |

In Table 7, "Frame Type" is a field indicating a signal type, and indicates that a corresponding signal is a Request Join signal. "Reserved" is a field reserved for future use, and is allocated, for example, 4 bits. "Sequence Number" is a field indicating the sequence of a corresponding signal, and is allocated, for example, 1 byte. As an example, "Sequence Number" is increased by 1 in correspondence with signal transmission/reception steps. "Network ID" is a field indicating the network ID of the wireless power transmitter 610, and is allocated, for example, 1 byte. "Product ID" is a field indicating the product information of the wireless power receiver 620, and for example, the serial number information of the wireless power receiver 620 is recorded in this field. The "Product ID" field is allocated, for example, 4 bytes. "Input Voltage MIN" is a field indicating a minimum voltage value applied to the input stage of the DC/DC conversion unit of the wireless power receiver 620, and is allocated, for example, 1 byte. "Input Voltage MAX" is a field indicating a maximum voltage value applied to the input stage of the DC/DC conversion unit of the wireless power receiver 620, and is allocated, for example, 1 byte. "Typical Output Voltage" is a field indicating a rated voltage value applied to the output stage of the DC/DC conversion unit of the wireless power receiver 620, and is allocated, for example, 1 byte. "Typical Output Current" is a field indicating a rated current value conducted to the output stage of the DC/DC conversion unit of the wireless power receiver 620, and is allocated, for example, 1 byte.

TABLE 8

| Frame Type | Reserved | Sequence Number | Network ID | Permission | Session ID |
|---|---|---|---|---|---|
| Response Join | 4 bit | 1 byte | 1 byte | 4 bit | 4 bit |

In Table 8, "Frame Type" is a field indicating a signal type, and indicates that a corresponding signal is a Response Join signal. "Reserved" is a field reserved for future use, and is allocated, for example, 4 bits. "Sequence Number" is a field indicating the sequence of a corresponding signal, and is allocated, for example, 1 byte. For example, "Sequence Number" may be increased by 1 in correspondence with signal transmission/reception steps. "Network ID" is a field indicating the network ID of the wireless power transmitter 610, and is allocated, for example, 1 byte. "Permission" is a field indicating whether or not the wireless power receiver 620 is permitted to join the wireless power network, and is allocated, for example, 4 bits. As an example, when the Permission field is set to 1, it indicates that the wireless power receiver 620 is permitted to join the wireless power network. However, when the Permission field is set to 0, it indicates that the wireless power receiver 620 is not permitted to join the wireless power network. "Session ID" is a field indicating the session ID that the wireless power transmitter 610 imparts to the wireless power receiver 620 in order to control the wireless power network, and is allocated, for example, 4 bits.

The wireless power receiver 620 continues to transmit a Request Join signal until it receives a Response Join signal from the wireless power transmitter 610. Further, the wireless power receiver 610 continues to transmit a Response Join signal until it receives an ACK signal from the wireless power receiver 620.

Figure 7:
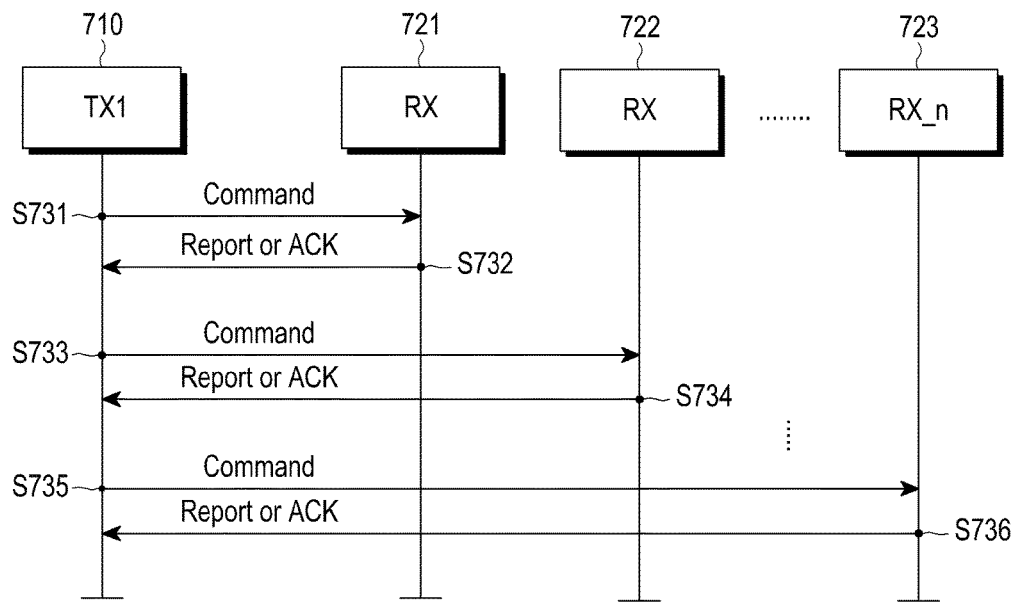
FIG. 7 is a timing chart illustrating signal transmission/reception between a wireless power transmitter and a wireless power receiver, according to an embodiment of the present invention.

FIG. 7 is a timing chart illustrating signal transmission/reception between a wireless power transmitter and a wireless power receiver, according to an embodiment of the present invention. In particular, the timing chart of FIG. 7 corresponds to a case where the wireless power receiver is in a standby state.

As shown in FIG. 7, a wireless power transmitter 710 transmits a command signal to each wireless power receiver 721, 722, 723 joined in the wireless power network that is under the control of the wireless power transmitter 710, in steps S731, S733 and S735. The command signal indicates operations that the wireless power transmitter 710 commands a corresponding wireless power receiver to perform. This signal is hereinafter referred to as "Command signal". The Command signal has a data structure as shown below in Table 9.

TABLE 9

| Frame Type | Session ID | Sequence Number | Network ID | Command Type | Variable |
|---|---|---|---|---|---|
| Command | 4 bit | 1 byte | 1 byte | 4 bit | 4 bit |

In Table 9, "Frame Type" is a field indicating a signal type, and indicates that a corresponding signal is a Command signal. "Session ID" is a field indicating the session ID that the wireless power transmitter 710 imparts to each wireless power receiver 721, 722, 723 in order to control the wireless power network, and is allocated, for example, 4 bits. "Sequence Number" is a field indicating the sequence of a corresponding signal, and is allocated, for example, 1 byte. For example, "Sequence Number" may be increased by 1 in correspondence with signal transmission/reception steps. "Network ID" is a field indicating the network ID of the wireless power transmitter 710, and is allocated, for example, 1 byte. "Command Type" is a field indicating a command type, and is allocated, for example, 4 bits. "Variable" is a field for supplementing the Command field, and is allocated, for example, 4 bits. The Command and Variable fields may include various examples as shown below in Table 10.

TABLE 10

| Command Type | Charge Start | Charge Finish | Request Report | Reset | Channel Scan | Change Channel |
|---|---|---|---|---|---|---|
| Variable | Reserved | reserved | CTL Level | Reset Type | Reserved | Channel |

"Charge Start" is a command for a corresponding wireless power receiver to start charging. "Charge Finish" is a command for a corresponding wireless power receiver to finish charging. "Request Report" is a command for a corresponding wireless power receiver to transmit a report signal. "Reset" is an initialization command. "Channel Scan" is a command for a corresponding wireless power receiver to perform channel scanning. "Channel Change" is a command for a corresponding wireless power receiver to perform channel change.

In an embodiment of FIG. 7, the wireless power transmitter 710 transmits a Command signal, the command type of which corresponds to "Request Report", to each wireless power receiver 721, 722, 723.

Upon receiving the Command signal from the wireless power transmitter 710, each wireless power receiver 721, 722, 723 transmits a report signal or an ACK signal, in steps S732, S734 and S736. More specially, when a command signal, the command type of which corresponds to "Request Report", is received, a corresponding wireless power receiver transmits a report signal. Contrarily, when a command signal, the command type of which corresponds to any command type other than "Request Report", is received, a corresponding wireless power receiver transmits an ACK signal. The report signal is a signal for reporting the current state of a corresponding wireless power receiver to the wireless power transmitter 710, and is referred to as "Report signal". The Report signal has a data structure as shown below in Table 11.

TABLE 11

| Frame Type | Session ID | Sequence Number | Network ID | Input Voltage | Output Voltage | Output Current | Reserved |
|---|---|---|---|---|---|---|---|
| Report | 4 bit | 1 byte | 1 byte | 1 byte | 1 byte | 1 byte | 1 byte |

In Table 11, "Frame Type" is a field indicating a signal type, and indicates that a corresponding signal is a Report signal. "Session ID" is a field indicating the session ID that the wireless power transmitter 710 imparts to each wireless power receiver 721, 722, 723 in order to control the wireless power network, and is allocated, for example, 4 bits. "Sequence Number" is a field indicating the sequence of a corresponding signal, and is allocated, for example, 1 byte. For example, "Sequence Number" may be increased by 1 in correspondence with signal transmission/reception steps. "Network ID" is a field indicating the network identifier (ID) of the wireless power transmitter 710, and is allocated, for example, 1 byte. "Input Voltage" is a field indicating a voltage value applied to the input stage of the DC/DC conversion unit of each wireless power receiver 721, 722, 723, and is allocated, for example, 1 byte. "Output Voltage" is a field indicating a voltage value applied to the output stage of the DC/DC conversion unit of each wireless power receiver 721, 722, 723, and is allocated, for example, 1 byte. "Output Current" is a field indicating a current value conducted to the input stage of the DC/DC conversion unit of each wireless power receiver 721, 722, 723, and may be allocated, for example, 1 byte.

The wireless power transmitter 710 continues to transmit a Command signal until it receives a Report signal or ACK signal from each wireless power receiver 721, 722, 723. When the wireless power transmitter 710 fails to receive a Report signal or ACK signal in response to a Command signal from a specific wireless power receiver for a predetermined period of time, it retransmits a Command signal to the corresponding wireless power receiver during a contention period.

Figure 8:
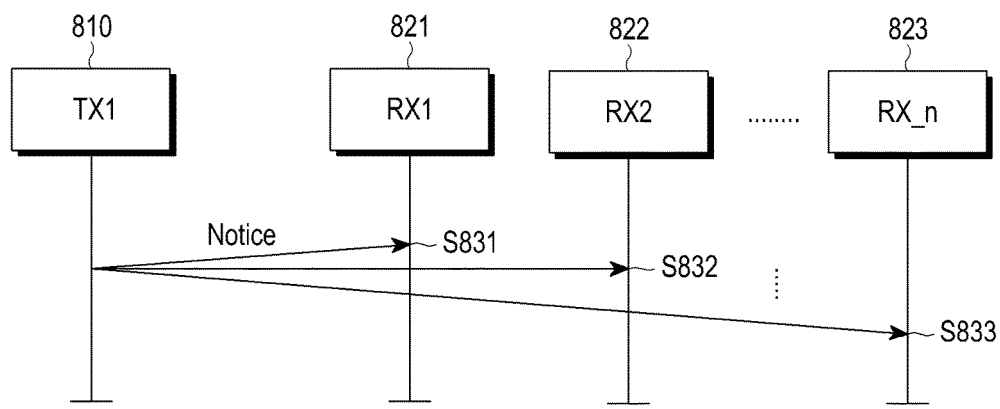
FIG. 8 is a diagram illustrating signal transmission/reception between a wireless power transmitter and a wireless power receiver, according to an embodiment of the present invention.

FIG. 8 is a diagram illustrating signal transmission/reception between a wireless power transmitter and a wireless power receiver, according to an embodiment of the present invention. As shown in FIG. 8, a wireless power transmitter 810 transmits a Notice signal to each wireless power receiver 821, 822, 823, in steps S831, S832 and S833. The Notice signal has the data structure shown in Table 1. The wireless power transmitter 810 periodically transmits a Notice signal, and a cycle in which the wireless power transmitter 810 transmits a Notice signal may be referred to as "1 superframe cycle". The Notice signal is used as a sync signal at periods of 1 superframe cycle. In addition, as shown in Table 1, the Notice signal includes the Rx to Report (schedule mask) field. Accordingly, when a new cycle is started, the wireless power transmitter 810 specifies wireless power receivers with which to perform communication. For example, a situation where the Rx to Report field of a Notice signal is filled is shown below in Table 12.

TABLE 12

| Rx to Report (schedule mask) | | | | | | | |
|---|---|---|---|---|---|---|---|
| Rx1 | Rx2 | Rxn | Rx4 | Rx5 | Rx6 | Rx7 | Rx8 |
| 1 | 0 | 1 | 0 | 0 | 0 | 0 | 0 |

When the Rx to Report (schedule mask) field of a Notice signal is filled as shown in Table 12, the first wireless power receiver 821 and the nth wireless power receiver 823 perform communication with the wireless power transmitter 810 during a corresponding cycle, but the second wireless power receiver 822 does not perform communication with the wireless power transmitter 810.

Figure 9:
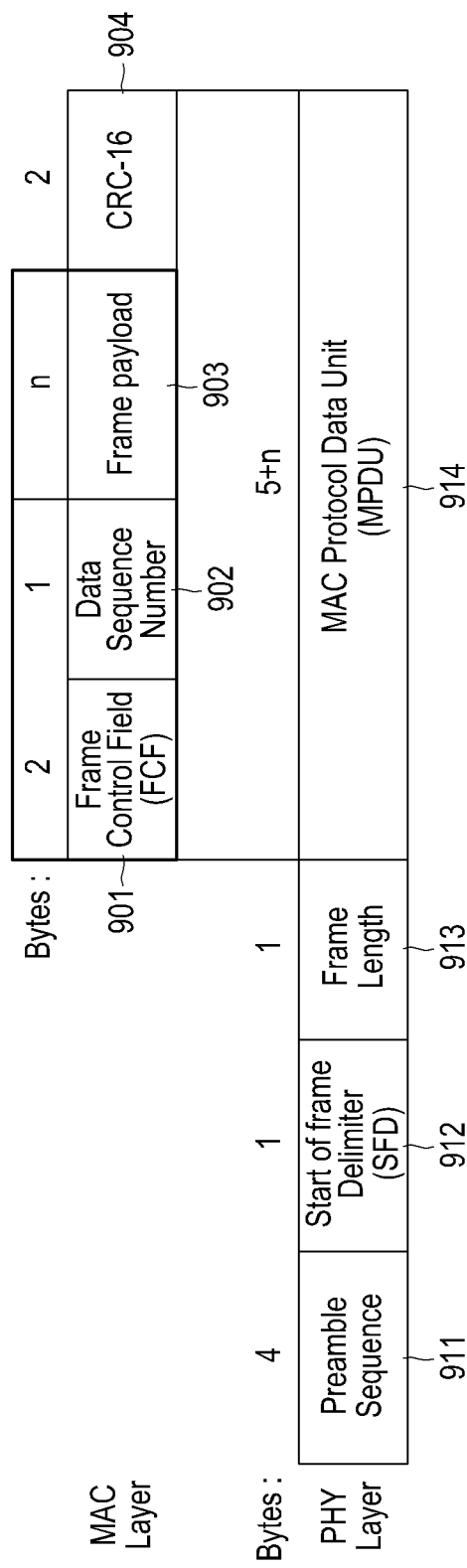
FIG. 9 is a diagram in which an MAC layer for a wireless power network is located in a data structure, according to an embodiment of the present invention.

FIG. 9 is a diagram illustrating a MAC layer for a wireless power network located in a data structure, according to an embodiment of the present invention.

Referring to FIG. 9, the physical layer includes a Preamble Sequence field 911, a Start of Frame Delimiter (SFD) field 912, a Frame Length field 913, and a MAC Protocol Data Unit (MPDU) field 914, as described above in Table 3. Further, the MAC Protocol Data Unit (MPDU) field 914 includes a Frame Control field 901, a Data Sequence Number field 902, a Frame Payload field 903, and a CRC-16 field 904. Various signals according to the present invention may use the Frame Control field 901, the Data Sequence Number field 902, and the Frame Payload field 903.

Transmission/reception of various signals between a wireless power transmitter and a wireless power receiver has been described above. Hereinafter, transmission/reception of various signals between a wireless power transmitter and a wireless power receiver will be described together with applied power. Particularly, in the following description, the state of the wireless power receiver will be divided into a detection state, a search state, a registration state, a standby state, and a charge state.

Figure 10:
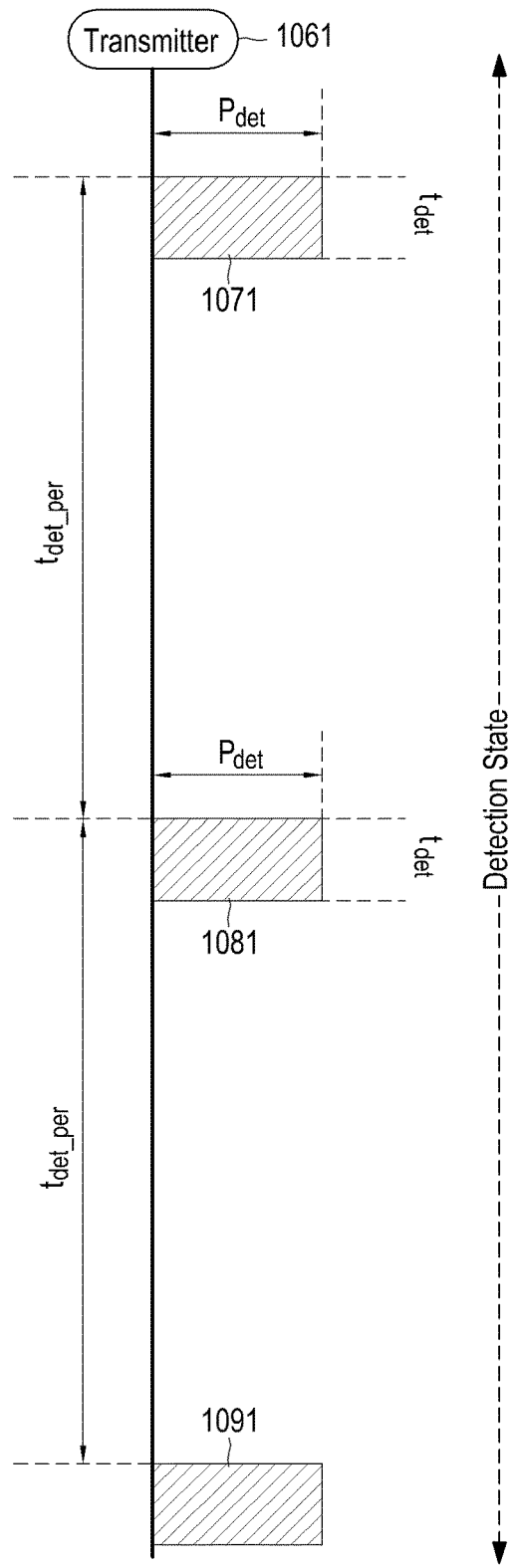
FIG. 10 is a timing chart when a wireless power receiver is in a detection state, according to an embodiment of the present invention.

FIG. 10 is a timing chart when a wireless power receiver is in a detection state, according to an embodiment of the present invention.

As shown in FIG. 10, a wireless power transmitter 1061 maintains a detection state in which it transmits a detection power ($P_{det}$) 1071, 1081, 1091 for an effective detection period ($t_{det}$) in each fixed detection cycle ($t_{det\_per}$). The magnitude of the detection power and the length of the effective detection period are determined depending on the minimum power and time required for the wireless power transmitter 1061 to detect the existence or nonexistence of a candidate device within its coverage by sensing a change in the load value of its power transmission unit, or resonator. Specifically, since only sensing a change in the load of the resonator is needed to detect a candidate device, such as, for example, a metal object, power consumption in the detection state can be minimized by periodically generating a low voltage sine wave for a time short enough to sense the load value of the resonator. Further, the detection state is maintained until a new device is detected during the effective detection period.

As an example, when a wireless power receiver is disposed on the wireless power transmitter 1061, the wireless power transmitter 1061 can detect a change of load and thus, identify that an object is disposed thereabout. Although FIG. 10 shows that the wireless power transmitter 1061 detects an object, based on load change detection, this is merely illustrative, and the wireless power transmitter 1061 may detect an object by sensing a change in various criteria (parameters) such as, for example, voltage, current, temperature, and phase.

Figure 11:
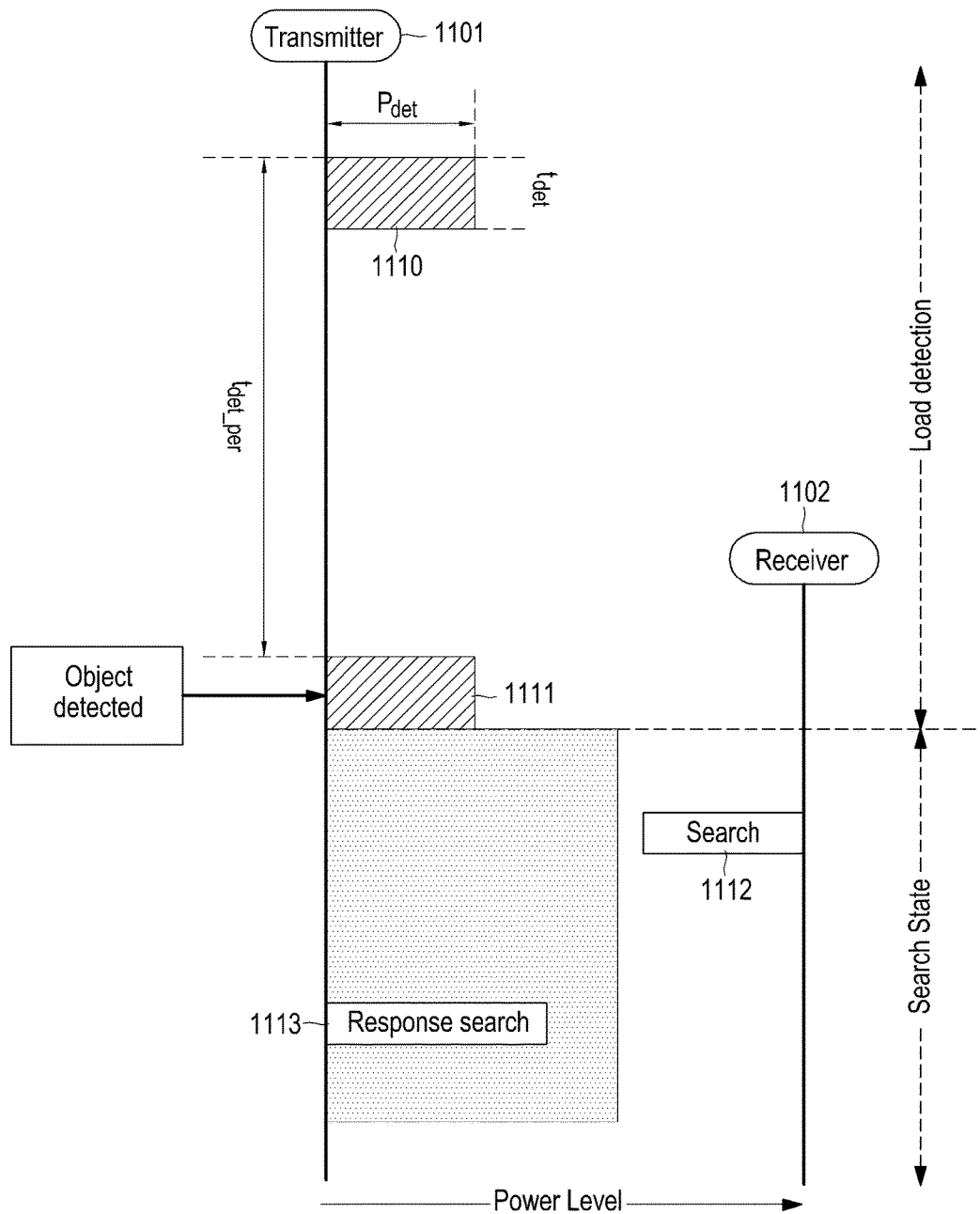
FIG. 11 is a timing chart when a wireless power receiver is in a search state, according to an embodiment of the present invention.

FIG. 11 is a timing chart when a wireless power receiver is in a search state, according to an embodiment of the present invention.

A wireless power transmitter 1101 maintains a detection state in which it transmits detection power ($P_{det}$) 1110, 1111 for an effective detection period ($t_{det}$) in each fixed detection cycle ($t_{det\_per}$). When a wireless power receiver 1102 is disposed in the vicinity of the wireless power transmitter 1101, the wireless power transmitter 1101 can sense a load change corresponding thereto and grasp such a situation during the period of transmitting the detection power 1111.

When a device is detected within the effective detection period, the wireless power transmitter 1101 transmits a drive power ($P_{reg}$) 1114. The drive power 1114 is a power available to drive the control unit or MCU of the wireless power receiver 1102. The wireless power receiver 1102 may transmit a Search signal 1112, and the wireless power transmitter 1101 may transmit a Response Search signal 1113 in response to the Search signal 1112.

Figure 12:
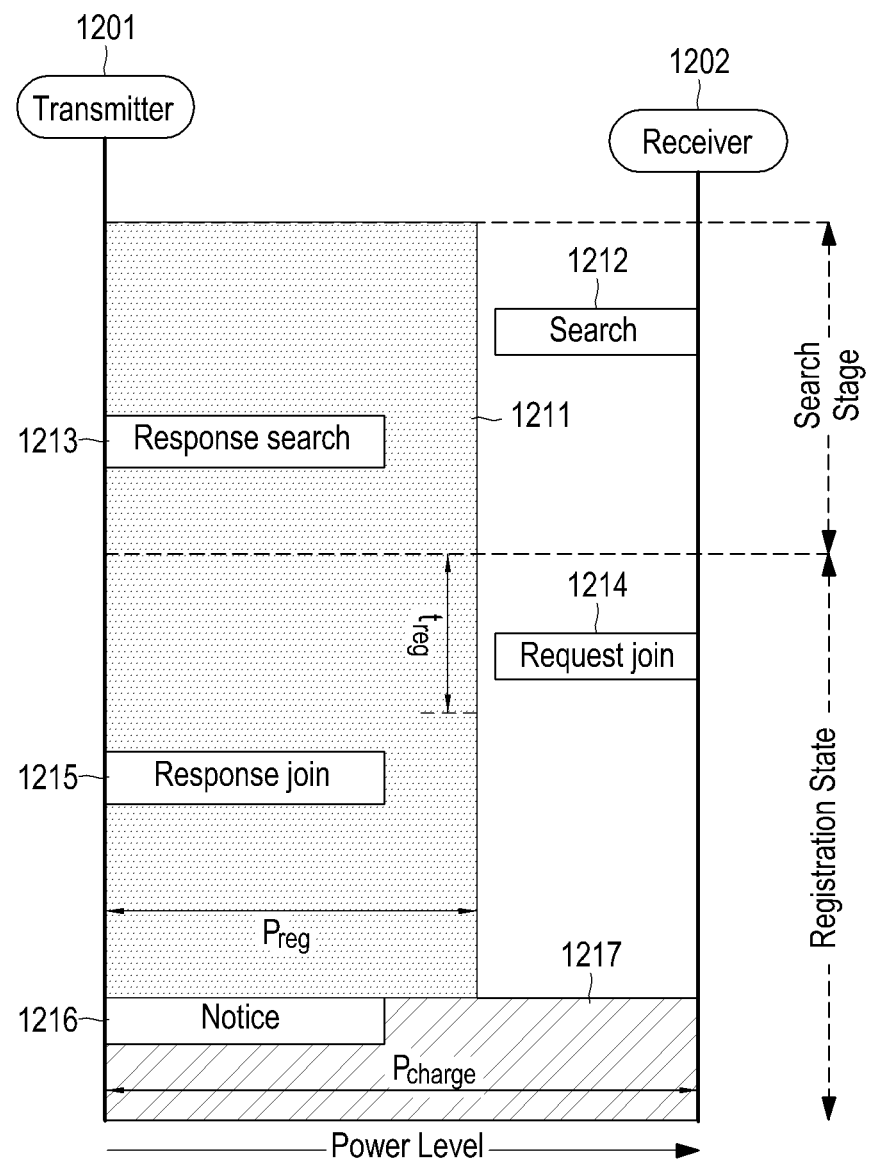
FIG. 12 is a timing chart when a wireless power receiver is in a registration state, according to an embodiment of the present invention.

FIG. 12 is a timing chart when a wireless power receiver is in a registration state, according to an embodiment of the present invention.

As described above with reference to FIG. 11, a wireless power transmitter 1201 applies a drive power 1211. A wireless power receiver 1202 transmits a Search signal 1212, and the wireless power transmitter 1201 transmits a Response Search signal 1213 in response to the Search signal 1212. As a result, pairing between the wireless power transmitter 1201 and the wireless power receiver 1202 is established.

The wireless power receiver 1202 transmits a Request Join signal 1214, and the wireless power transmitter 1201 waits to receive a Request Join signal 1214 for an effective registration period ($t_{reg}$).

Upon receiving the Request Search signal, the wireless power transmitter 1201 transmits a response Join signal 1215. As described above, the Response Join signal 1215 includes the Permission field, and a value of 0 or 1 recorded in the Permission field indicates whether the wireless power receiver 1202 is permitted to join the wireless power network that is under the control of the wireless power transmitter 1201. When the Permission field of the Response Join signal 1215 has a value of 0, the wireless power receiver 1202 is not permitted to join the wireless power network, and may be in a standby state. Contrarily, when the Permission field of the Response Join signal 1215 has a value of 1, the wireless power receiver 1202 may enter a charge state and receive a charge power 1217. Further, the wireless power transmitter 1201 periodically transmits a Notice signal 1216.

Figure 13:
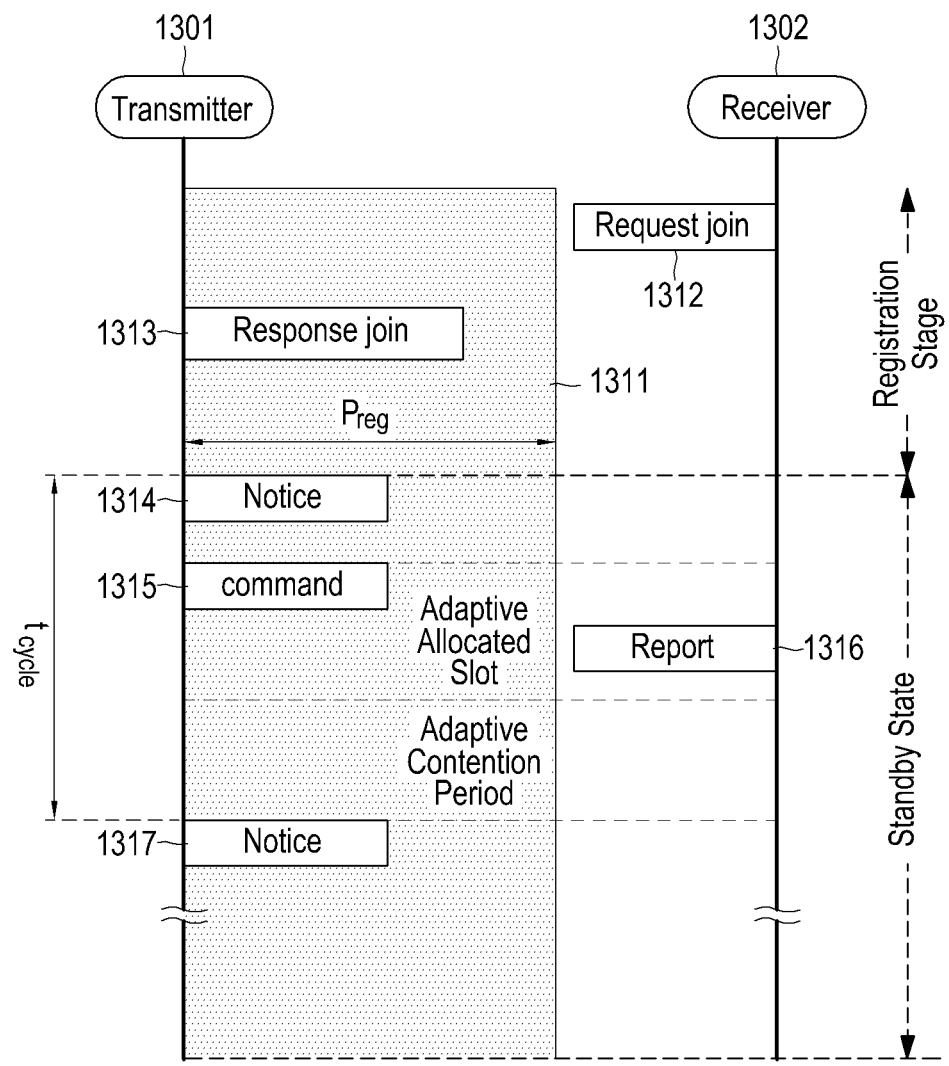
FIG. 13 is a timing chart when a wireless power receiver is in a standby state, according to an embodiment of the present invention.

FIG. 13 is a timing chart when a wireless power receiver is in a standby state, according to an embodiment of the present invention. As described above, a wireless power receiver 1302 preferentially enters a standby state before entering a charge state.

In a registration state, the wireless power receiver 1302 may transmit a Request Join signal 1312, and a wireless power transmitter 1301 transmits a Response Join signal 1313 in response to the Request Join signal 1312. Further, as described above, the wireless power transmitter 1301 transmits a Notice signal 1314, 1317 in a predetermined cycle ($t_{cycle}$). The Notice signal 1314, 1317 is transmitted for a relatively short time so as not to affect the overall cycle ($t_{cycle}$).

The wireless power transmitter 1301 transmits a Command signal 1315 during a time allocated to the wireless power receiver 1302 and receives a Report signal 1316 or an ACK signal in response to the Command signal 1315. When the wireless power transmitter 1301 fails to receive the Report signal 1316 or the ACK signal, it retransmits a Command signal during a contention period. As described above, the Command signal 1315 includes the Command Type field, and the wireless power receiver 1302 may enter a charge state when the Command Type field corresponds to "Charge Start".

Figure 14:
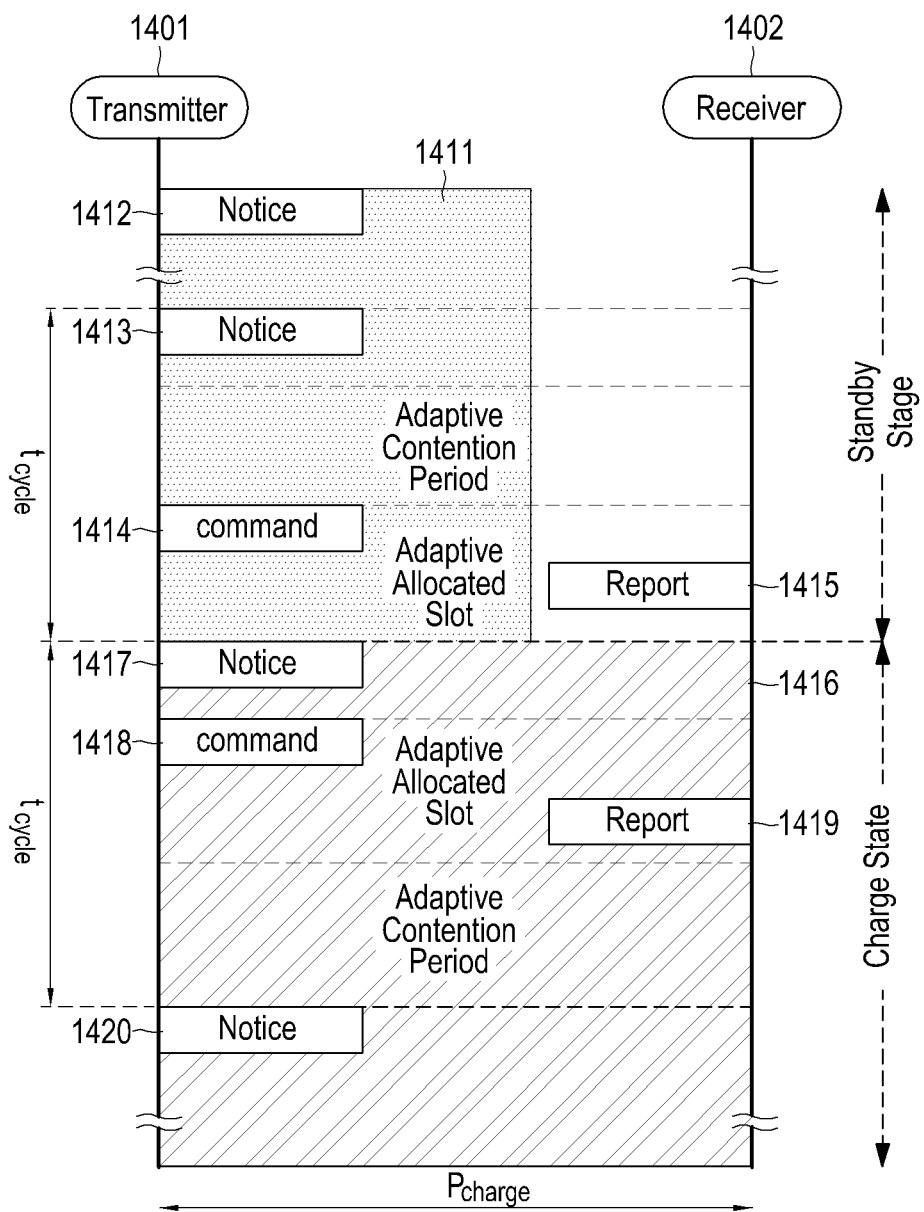
FIG. 14 is a timing chart when a wireless power receiver is in a charge state, according to an embodiment of the present invention.

FIG. 14 is a timing chart when a wireless power receiver is in a charge state, according to an embodiment of the present invention.

A wireless power transmitter 1401 transmits a Notice signal 1412, 1413, 1417, 1420 in a predetermined cycle ($t_{cycle}$). In a standby state, the wireless power transmitter 1401 transmits a Command signal 1414, and a wireless power receiver 1402 transmits a Report signal 1415 in response to the Command signal 1414.

The wireless power transmitter 1401 may parse the Report signal and thereby determine whether to transmit charge power ($P_{charge}$) to the wireless power receiver 1402. For example, the wireless power transmitter 1401 parses the current power information of the wireless power receiver 1402 through the Report signal, and thereby determine whether to transmit charge power ($P_{charge}$) to the wireless power receiver 1402.

When the wireless power transmitter 1401 determines to transmit charge power ($P_{charge}$), it increases a drive power 1411 to a charge power ($P_{charge}$), and then applies the increased charge power ($P_{charge}$). The wireless power transmitter 1401 transmits a Command signal 1418, the command type of which corresponds to "Charge Start".

The wireless power receiver 1402 parses the Command signal 1418 and performs charging by controlling the switch unit to be in an ON state. The Command signal 1418 contains information that commands the wireless power receiver 1402 to perform charging at a predetermined time after reception of the Command signal, and thus, the wireless power receiver 1402 performs charging at the predetermined time after reception of the Command signal 1418. The wireless power receiver 1402 transmits an ACK signal 1419.

Figure 15A:
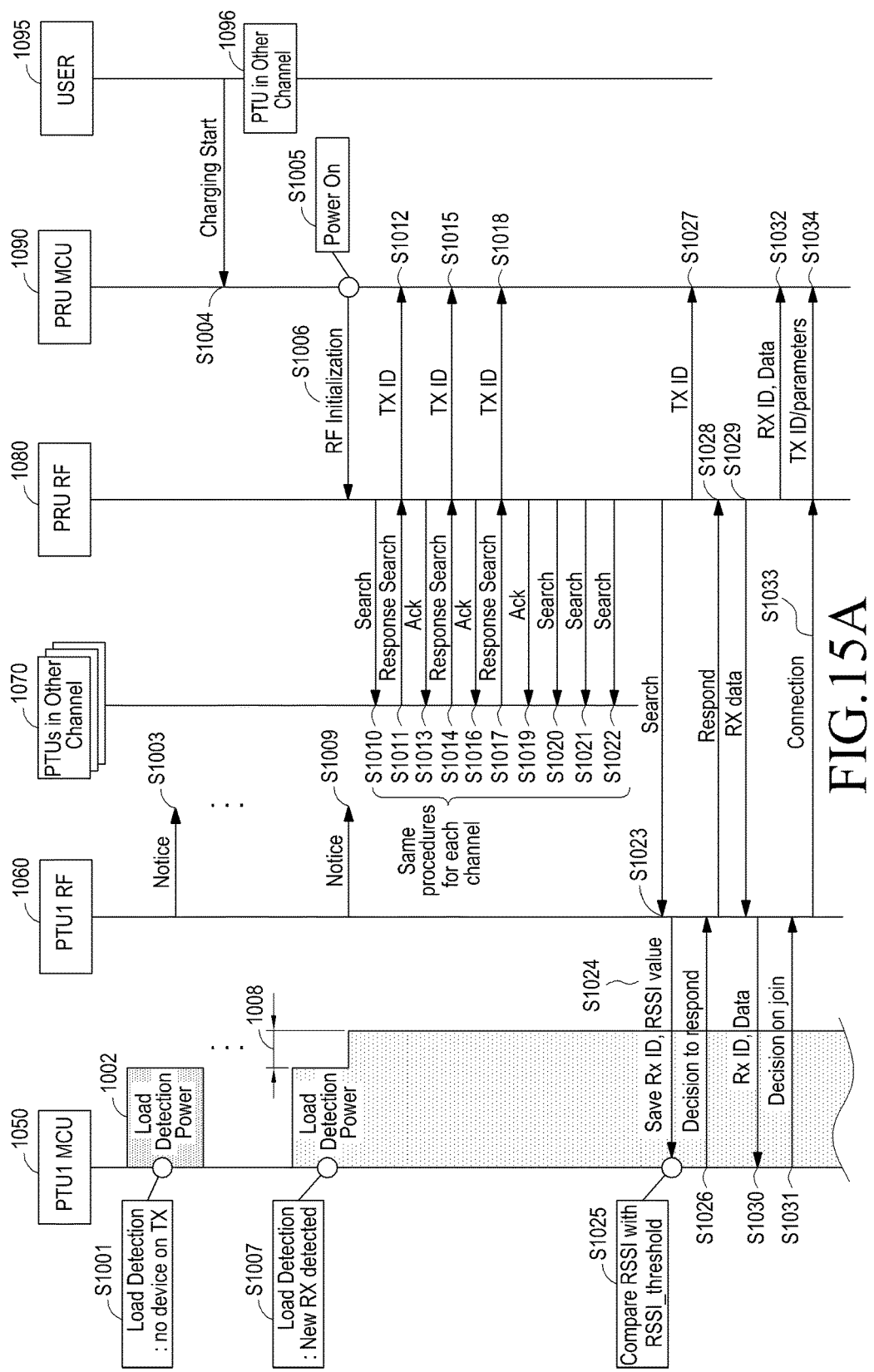
FIGS. 15A and 15B are timing charts illustrating communication between a wireless power transmitter and wireless power receiver, according to an embodiment of the present invention.
Figure 15B:
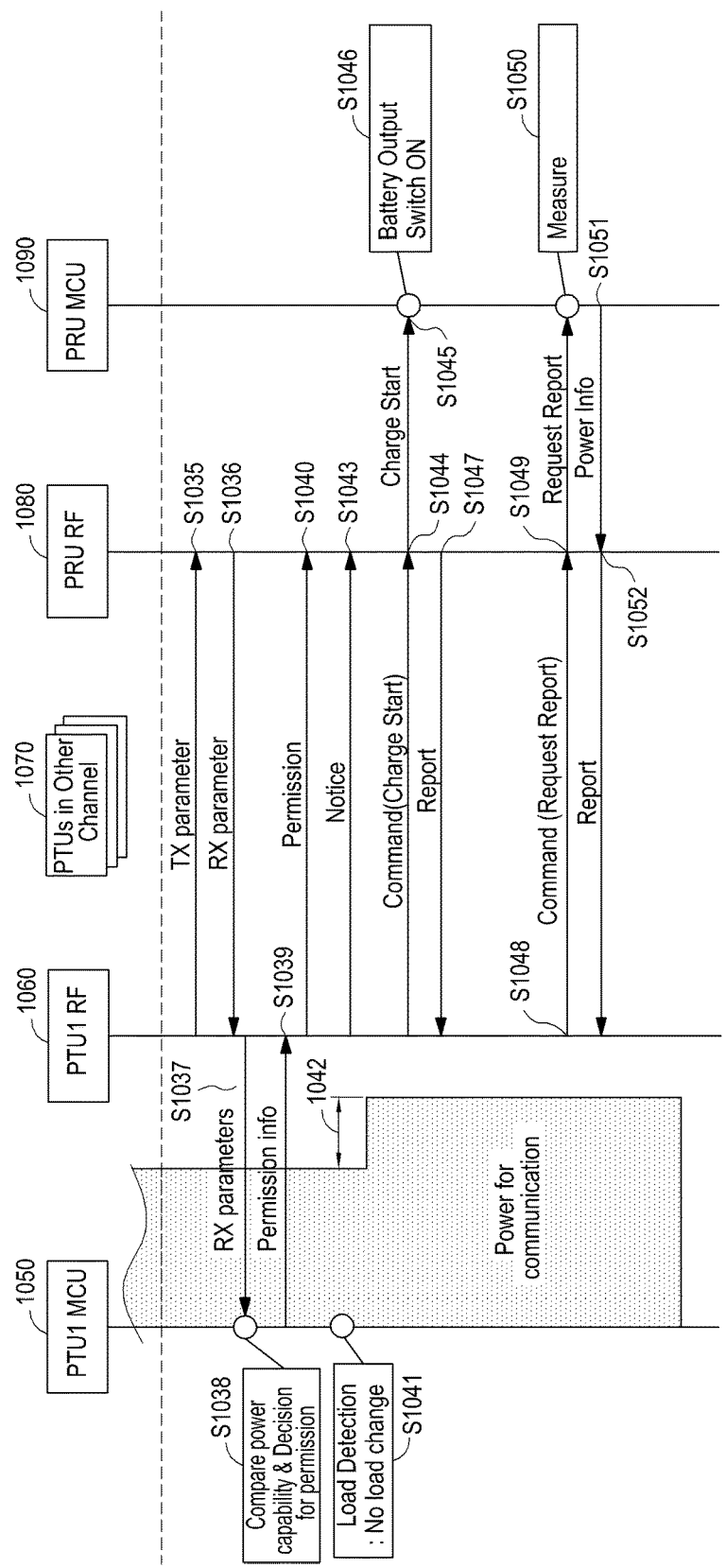

FIGS. 15A and 15B are timing charts illustrating a communication between a wireless power transmitter and a wireless power receiver, according to an embodiment of the present invention. FIGS. 15A and 15B are timing charts illustrating a communication using Bluetooth low energy between the wireless power transmitter and the wireless power receiver.

A controlling unit 1050 of a wireless power transmitter outputs a detecting power 1002 periodically. When a wireless power receiver is positioned on the wireless power transmitter, the controlling unit 1050 of the wireless power transmitter detects a change of load magnitude, in step S1001. A communicating unit 1060 transmits a NOTICE signal periodically, in steps S1003 and S1009. However, at the first time, it is assumed that the wireless power receiver is not positioned on the wireless power transmitter. The controlling unit 1050 of the wireless power transmitter cannot detect the change of load value.

A user 1095 puts the wireless power receiver on the wireless power transmitter, in step S1004.

The controlling unit 1050 of the wireless power transmitter outputs the load detection power after the predetermined cycle, and detects an abrupt change of load value, in step S1007. The controlling unit 1050 of the wireless power transmitter transmits a drive power ($P_{reg}$) when the controlling unit 1050 of the wireless power transmitter detects the wireless power receiver within the effective detection period. The drive power has a power of magnitude for driving a controlling unit 1090 of the wireless power receiver and has larger magnitude 1008 compared to the load detection power.

The controlling unit 1090 of the wireless power receiver is turned on by the drive power 1050. The controlling unit 1090 of the wireless power receiver initiates a communicating unit 1080 of the wireless power receiver, in step S1006.

The communicating unit 1080 of the wireless power receiver may use a second channel by controlling of the controlling unit 1090. The second channel is the channel used by another wireless power transmitter 1070, which is different from the channel used by a communicating unit 1060 of the wireless power transmitter. The channel using by the communicating unit 1060 of the wireless power transmitter may be referred as a first channel.

The order of determining the detection channel of controlling unit 1090 may be determined. The first detection channel of controlling unit 1090 may be determined randomly among a plurality channels defined by a Bluetooth low energy scheme.

The communicating unit 1080 transmits a Search signal in the second channel, in step 1010. The Search signal includes device information for the wireless power receiver. The Search signal is referred to as the device information for wireless power receiver. For example, the device information for the wireless power receiver may include an ID of the wireless power receiver and information about the device. Information about the device may include at least one of manufacturer information, a serial number, a protocol version, a hardware version, and a parameter regarding charging of the wireless power receiver. The device information of the wireless power receiver includes at least one of a protocol version, a sequence number, manufacturer information, device information, impedance information, power capacity information, device ID information, network ID information and a wireless charging service profile.

It is assumed that three wireless power transmitters 1070 use the second channel in FIG. 15A. Each of the three wireless power transmitters 1070 transmits a Response search signal to the communicating unit 1080 in steps S1011, S1014, S1017. The communicating unit 1080 transmits ACK signals to each of three wireless power transmitters 1070 in steps 1013,1016, and 1019.

The communicating unit 1080 further transmits Search signals in steps S1020,S1021, and S1022.

The controlling unit 1090 changes the detection channel from the second channel to the first channel. The controlling unit 1080 transmits a Search signal using the first channel, in step S1023. The communicating unit 1060 receives the Search signal using the first channel, the controlling unit 1050 saves an ID of the wireless power receiver and an RSSI value, in step S1024. The controlling unit 1050 compares the saved RSSI value with threshold, in step S1025. The controlling unit 1050 determines whether to respond or not based on the comparison result, in step S1026. If the controlling unit 1050 determines to respond, the communicating unit 1060 transmits a response signal, in step S1028. The response signal includes the device information for wireless power transmitter. The response signal includes at least one of a protocol version, a sequence number, manufacturer information, device information, impedance information, required power amount information and a wireless charging profile. The device information of the wireless power transmitter includes at least one of a protocol version, a sequence number, ID information of the wireless power transmitter, ID information of the wireless power receiver, a wireless charging service profile, device ID information and a power class.

The controlling unit 1090 controls the communicating unit 1080, in step S1032. The communicating unit 1080 transmits an ID of the wireless power receiver and device information, in step S1029. The controlling unit 1050 receives the ID of the wireless power receiver and device information, in step S1030. The controlling unit 1050 determines whether to join the wireless power receiver, in step S1031.

When the wireless power transmitter determines to join the wireless power receiver, the communicating unit 1060 transmits a connection signal to the communicating unit 1080, m in step S1033. The connection signal includes at least one of a duration for connection, an address for wireless power transmitter and an address for wireless power receiver. The wireless power receiver perceives an ID of the wireless power transmitter and parameters based on the received connection signal, in step S1034.

According to another embodiment of the present invention, the wireless power transmitter may receive the Search signal and then transmit the connection signal directly, i.e., in two steps.

Referring now to FIG. 15B, the communicating unit 1060 transmits a parameter signal of the wireless power transmitter (TX parameter) to the communicating unit 1080, in step S1035. The parameter signal of the wireless power transmitter (TX parameter) includes at least one of an ID of the wireless power transmitter, an ID of the wireless power receiver, manufacturer information, a serial number, a protocol version, a hardware version, a capacity of power for the wireless power transmitter, a number of wireless power receiver which is charging, a capacity of power for charging, a capacity of remainder power for the wireless power transmitter.

The communicating unit 1080 transmits a parameter signal of the wireless power receiver (RX parameter), in step S1036.

The controlling unit 1050 perceives parameter information of the wireless power receiver, in step S1037. The controlling unit 1050 determines whether to join the wireless power receiver to the wireless power network, in step S1038. The controlling unit 1050 creates a permission signal for joining the wireless power receiver in step S1039, and transmits the permission signal to the communication unit 1080, in step S1040.

The controlling unit 1050 detects the change of load value periodically. The controlling unit 1050 detects no change of load value, in step S1041. The communicating unit 1060 transmits Notice signal, in step S1043. The controlling unit 1050 increases output power in an amount of 1042 and transmits a charge power. The communicating unit 1060 transmits a Charge start signal to the communicating unit 1080, in step S1044. The controlling unit 1090 starts charging based on the Charge start signal, in step S1045. For example, the controlling unit 1090 controls the switch to on state, in step S1046. The communication unit 1080 transmits the Report signal or ACK signal to the communication unit 1060, in step S1047. The communication unit 1060 transmits a Request Report signal, in step S1049. The controlling unit 1090 detects a charging state, in step S1050. The controlling unit 1090 creates a Report signal based on the detected charging state, in step S1051. The communication unit 1080 transmits the created Report signal, in step S1052. As illustrated above, the present invention provides wireless power charging based on Bluetooth low energy scheme.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of controlling a wireless power receiver, the method comprising:
    receiving, from a wireless power transmitter, a first power for initiating a communication unit through a power reception unit of the wireless power receiver;
    after initiating the communication unit, establishing a communication connection with the wireless power transmitter while receiving the first power, through the communication unit of the wireless power receiver;
    joining, through the communication unit, a wireless power network corresponding to the wireless power transmitter while receiving the first power;
    receiving, through the communication unit, a command signal indicating a charge start command from the wireless power transmitter; and
    based on receiving the command signal, starting charging a battery of the wireless power receiver, by using a second power which is received through the power reception unit from the wireless power transmitter.

2. The method as claimed in claim 1, wherein establishing the communication connection includes:
    transmitting, through the communication unit, a first signal to the wireless power transmitter; and
    receiving, through the communication unit, a second signal corresponding to the first signal from the wireless power transmitter.

3. The method as claimed in claim 2, wherein the first signal comprises information of impedance regarding the wireless power receiver.

4. The method as claimed in claim 1, wherein joining the wireless power network includes:
    transmitting, through the communication unit, a third signal to the wireless power transmitter; and
    receiving, through the communication unit, a fourth signal corresponding to the third signal from the wireless power transmitter.

5. The method as claimed in claim 4,
    wherein the third signal comprises at least one of information regarding a Product ID of the wireless power receiver, information regarding a minimum voltage value applied to an input stage of a DC/DC conversion unit of the wireless power receiver and information regarding a maximum voltage value applied to the input stage of the DC/DC conversion unit of the wireless power receiver, and
    wherein the fourth signal comprises at least one of manufacturer information of the wireless power transmitter, information regarding a protocol version of the wireless power transmitter, information regarding a hardware version of the wireless power transmitter, and information regarding power capacity of the wireless power transmitter.

6. The method as claimed in claim 1, wherein receiving the second power for charging the wireless power receiver includes starting to receive the second power for charging the wireless power receiver after receiving the command signal.

7. A wireless power receiver comprising:
    a battery;
    a communication unit;
    a power reception unit configured to receive, from a wireless power transmitter, a first power for initiating the communication unit; and
    a controller configured to
        after initiating the communication unit establish, by using the communication unit, a communication connection with the wireless power transmitter while receiving the first power,
        join, by using the communication unit, a wireless power network corresponding to the wireless power transmitter while receiving the first power,
        receive, by using the communication unit, a command signal indicating a charge start command from the wireless power transmitter, and
        based on receiving the command signal, control the wireless power receiver to start charging the battery by using a second power which is received through the power reception unit from the wireless power transmitter.

8. The wireless power receiver as claimed in claim 7, wherein the controller is further configured to transmit, by using the communication unit, a first signal to the wireless power transmitter and receive a second signal corresponding to the first signal from the wireless power transmitter.

9. The wireless power receiver as claimed in claim 8, wherein the first signal comprises information of impedance regarding the wireless power receiver.

10. The wireless power receiver as claimed in claim 7, wherein the controller is further configured to, by using the communication unit, transmit a third signal to the wireless power transmitter and receive a fourth signal corresponding to the third signal from the wireless power transmitter.

11. The wireless power receiver as claimed in claim 10, wherein the third signal comprises at least one of information regarding a Product ID of the wireless power receiver, information regarding a minimum voltage value applied to an input stage of a DC/DC conversion unit of the wireless power receiver and information regarding a maximum voltage value applied to the input stage of the DC/DC conversion unit of the wireless power receiver, and wherein the fourth signal comprises at least one of manufacturer information of the wireless power transmitter, information regarding a protocol version of the wireless power transmitter, information regarding a hardware version of the wireless power transmitter, and information regarding power capacity of the wireless power transmitter.

12. The wireless power receiver as claimed in claim 10, wherein the power reception unit is further configured to start to receive the second power for charging the wireless power receiver after receiving the command signal.

13. A method of controlling a wireless power transmitter, the method comprising:

transmitting a first power for initiating a communication unit of a wireless power receiver through a power reception unit of the wireless power receiver;

establishing, through the communication unit of the wireless power receiver, a communication connection with the wireless power receiver while transmitting the first power;

registering, by using the communication unit, the wireless power receiver to a wireless power network corresponding to the wireless power transmitter while transmitting the first power;

transmitting, through the communication unit, a command signal indicating a charge start command to the wireless power receiver; and after transmitting the command signal, transmitting a second power for charging the wireless power receiver through the power reception unit, wherein the wireless power receiver starts to charge a battery of the wireless power receiver by using the second power, based on receiving the command signal.

14. The method as claimed in claim 13, wherein establishing the communication connection includes:

receiving, through the communication unit, a first signal from the wireless power receiver; and transmitting, through the communication unit, a second signal corresponding to the first signal to the wireless power receiver.

15. The method as claimed in claim 14, wherein the first signal comprises information of impedance regarding the wireless power receiver.

16. The method as claimed in claim 13, wherein registering the wireless power receiver to the wireless power network includes:

receiving, through the communication unit, a third signal from the wireless power receiver; and transmitting, through the communication unit, a fourth signal corresponding to the third signal to the wireless power receiver.

17. The method as claimed in claim 16, wherein the third signal comprises at least one of information regarding a Product ID of the wireless power receiver, information regarding a minimum voltage value applied to an input stage of a DC/DC conversion unit of the wireless power receiver and information regarding a maximum voltage value applied to the input stage of the DC/DC conversion unit of the wireless power receiver, and wherein the fourth signal comprises at least one of manufacturer information of the wireless power transmitter, information regarding a protocol version of the wireless power transmitter, information regarding a hardware version of the wireless power transmitter, and information regarding power capacity of the wireless power transmitter.

18. A wireless power transmitter comprising:

a power transmission unit;

a communication unit; and a controller configured to transmit, by using the power transmission unit, a first power for initiating the communication unit of a wireless power receiver, establish, by using the communication unit, a communication connection with the wireless power receiver while transmitting the first power, register, by using the communication unit, the wireless power receiver to a wireless power network corresponding to the wireless power transmitter while transmitting the first power, transmit, by using the communication unit, a command signal indicating a charge start command to the wireless power receiver, and transmit, by using the power transmission unit, a second power for charging the wireless power receiver, after transmitting the command signal, wherein the wireless power receiver starts to charge a battery of the wireless power receiver by using the second power, based on receiving the command signal.

19. The wireless power transmitter as claimed in claim 18, wherein the controller is further configured to receive, by using the communication unit, a first signal from the wireless power receiver and transmit a second signal corresponding to the first signal to the wireless power receiver.

20. The wireless power transmitter as claimed in claim 19, wherein the first signal comprises information of impedance regarding the wireless power receiver.

21. The wireless power transmitter as claimed in claim 18, wherein the controller is further configured to receive, by using the communication unit, a third signal from the wireless power receiver and transmit a fourth signal corresponding to the third signal to the wireless power receiver.

22. The wireless power transmitter as claimed in claim 21, wherein the third signal comprises at least one of information regarding a Product ID of the wireless power receiver, information regarding a minimum voltage value applied to an input stage of a DC/DC conversion unit of the wireless power receiver and information regarding a maximum voltage value applied to the input stage of the DC/DC conversion unit of the wireless power receiver, and wherein the fourth signal comprises at least one of manufacturer information of the wireless power transmitter, information regarding a protocol version of the wireless power transmitter, information regarding a hardware version of the wireless power transmitter, and information regarding power capacity of the wireless power transmitter.

* * * * *